United States Patent
Kawasaki et al.

(10) Patent No.: US 10,137,972 B2
(45) Date of Patent: Nov. 27, 2018

(54) VESSEL CHARACTERISTIC ESTIMATION DEVICE AND AUTOMATIC STEERING DEVICE

(71) Applicant: Furuno Electric Co., Ltd., Nishinomiya (JP)

(72) Inventors: Chizu Kawasaki, Nishinomiya (JP); Masashi Imasaka, Nishinomiya (JP); Hitoshi Maeno, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 112 days.

(21) Appl. No.: 15/329,728

(22) PCT Filed: Jul. 1, 2015

(86) PCT No.: PCT/JP2015/068995
§ 371 (c)(1),
(2) Date: Jan. 27, 2017

(87) PCT Pub. No.: WO2016/017358
PCT Pub. Date: Feb. 4, 2016

(65) Prior Publication Data
US 2017/0233051 A1  Aug. 17, 2017

(30) Foreign Application Priority Data
Jul. 28, 2014  (JP) .................. 2014-152621

(51) Int. Cl.
*B63H 25/04* (2006.01)
*G01P 5/00* (2006.01)
(Continued)

(52) U.S. Cl.
CPC ............. *B63H 25/04* (2013.01); *B63B 49/00* (2013.01); *B63H 25/382* (2013.01); *G01P 3/00* (2013.01);
(Continued)

(58) Field of Classification Search
CPC .................. B63H 25/04; B63H 25/382; B63H 2025/045; B63B 49/00; B63B 2213/02;
(Continued)

(56) References Cited

U.S. PATENT DOCUMENTS

| 3,881,094 A | 4/1975 | Taylor et al. |
| 8,219,267 B2 * | 7/2012 | Hamke ...................... G01P 7/00 |
| | | 701/14 |

(Continued)

FOREIGN PATENT DOCUMENTS

| CN | 102811903 A | 12/2012 |
| JP | H08233595 A | 9/1996 |

(Continued)

OTHER PUBLICATIONS

Hawkes et al., An electrical method of resolving true wind velocity aboard ship, 1950, IEEE, p. 1-4 (Year: 1950).*

(Continued)

*Primary Examiner* — McDieunel Marc
(74) *Attorney, Agent, or Firm* — Alleman Hall Creasman & Tuttle LLP

(57) ABSTRACT

To easily grasp a relationship of parameter values which influence a log velocity of a ship, with the log velocity of the ship caused by the parameters, a ship characteristic estimating device is provided, which includes a data outputter configured to output a plurality of parameter data respectively including rotational speed data of a propeller of a ship, and wind velocity vector data of wind force that may act on the ship, and an estimator configured to receive the plurality of parameter data outputted from the data outputter, estimate values corresponding to the respective parameter data to be log velocity vectors of the ship, and output them as first (Continued)

output values. The rotational speed data are same as each other and the wind velocity vector data are different from each other.

20 Claims, 29 Drawing Sheets

(51) Int. Cl.
*B63B 49/00* (2006.01)
*B63H 25/38* (2006.01)
*G01P 3/00* (2006.01)
*G01P 5/06* (2006.01)
*G05D 1/02* (2006.01)
*B63J 99/00* (2009.01)

(52) U.S. Cl.
CPC .............. *G01P 5/00* (2013.01); *G01P 5/06* (2013.01); *G05D 1/0206* (2013.01); *B63B 2213/02* (2013.01); *B63H 2025/045* (2013.01); *B63J 2099/006* (2013.01)

(58) Field of Classification Search
CPC ......... B63J 2099/006; G01P 3/00; G01P 5/00; G01P 13/045; G01P 7/00; G05D 1/0206; G01C 21/165; G01C 25/005; G01V 1/3817; F03D 7/04
See application file for complete search history.

(56) References Cited

U.S. PATENT DOCUMENTS

| | | | | |
|---|---|---|---|---|
| 8,768,621 | B2* | 7/2014 | Ruizenaar | G01C 25/005 |
| | | | | 701/505 |
| 8,824,239 | B2* | 9/2014 | Welker | G01V 1/3817 |
| | | | | 367/15 |
| 9,822,764 | B2* | 11/2017 | Esbensen | F03D 7/04 |
| 2011/0257920 | A1* | 10/2011 | Onda | G01C 21/165 |
| | | | | 702/94 |
| 2014/0046510 | A1* | 2/2014 | Randolph | G01P 13/045 |
| | | | | 701/14 |
| 2016/0229500 | A1* | 8/2016 | Ando | B63B 49/00 |

FOREIGN PATENT DOCUMENTS

| | | |
|---|---|---|
| JP | 2002316692 A | 10/2002 |
| JP | 2003344437 A | 12/2003 |
| JP | 2010223639 A | 10/2010 |
| JP | 2011214471 A | 10/2011 |
| KR | 20080071269 A | 8/2008 |

OTHER PUBLICATIONS

Ding et al., Application of nonlinear filter on the position estimation of dynamic positioned ship, 2011, IEEE, p. 1071-1074 (Year: 2011).*

ISA Japan Patent Office, International Search Report Issued in Application No. PCT/JP2015/068995, dated Sep. 29, 2015, WIPO, 2 pages.

State Intellectual Property Office, Office Action and Search Report Issued in Application No. 201580040234.1, dated May 16, 2018, 5 pages.

European Patent Office, Extended European Search Report Issued in European Application No. 15826886.2, dated Jan. 4, 2018, Germany, 9 pages.

* cited by examiner

VESSEL CHARACTERISTIC ESTIMATION DEVICE AND AUTOMATIC STEERING DEVICE

TECHNICAL FIELD

This disclosure relates to a ship characteristic estimating device which estimates characteristics of a ship, and an autopilot system which includes the ship characteristic estimating device.

BACKGROUND ART

Conventionally, various kinds of schemes are tried out to accurately grasp a state of a ship (characteristics of a ship which change over time). For example, Patent Document 1 discloses a system capable of diagnosing a state of a ship based on operational information (temperature, pressure, rotational speed etc. of a propulsion system of the ship) detected by various sensors attached to the ship.

REFERENCE DOCUMENT OF CONVENTIONAL ART

Patent Document

Patent Document 1: JP2002-316692A

DESCRIPTION OF THE DISCLOSURE

Problems to be Solved by the Disclosure

Incidentally, in grasping a state of a ship, it is extremely important to grasp a relationship of parameter values which influence a log velocity of the ship (a velocity of the ship over water), with an actual log velocity of the ship corresponding to the respective values. By grasping this relationship, for example, it becomes possible to plan a travel of the ship more accurately. However, nothing regarding this is described in the patent document described above.

For example, examples of the parameters which influence the log velocity of the ship include a rotational speed of a propeller of the ship and wind force against the ship. Moreover, in a certain ship, to grasp a relationship between the rotational speed of the propeller and the log velocity of the ship caused by the rotational speed, experiments need to be conducted while the other parameters which influence the log velocity of the ship (wind force etc.) are kept stable, which is extremely troublesome. This is similar in a case of grasping a relationship between the wind force against the ship and the log velocity of the ship caused by the wind force.

This disclosure is to solve the above situations and aims to easily grasp a relationship of parameter values which influence a log velocity of a ship, with the log velocity of the ship caused by the parameters.

SUMMARY OF THE DISCLOSURE (1) To solve the above problems, according to one aspect of the present disclosure, a ship characteristic estimating device is provided. The device includes a data outputter configured to output a plurality of parameter data respectively including rotational speed data indicating a rotational speed of a propeller of a ship, and wind velocity vector data indicating a wind velocity vector of wind force that may act on the ship, and an estimator configured to receive the plurality of parameter data outputted from the data outputter, estimate values corresponding to the respective parameter data to be log velocity vectors of the ship, and output the log velocity vectors as first output values. The rotational speed data included in the plurality of parameter data indicate the same rotational speed, and the wind velocity vector data included in the plurality of parameter data indicate different wind velocity vectors. Each of the first output values is estimated and outputted as the log velocity vector of the ship when the ship travels at the rotational speed indicated by the rotational speed data.

(2) To solve the above problems, according to another aspect of the present disclosure, a ship characteristic estimating device is provided. The device includes a data outputter configured to output a plurality of parameter data respectively including rotational speed data indicating a rotational speed of a propeller of a ship, and wind velocity vector data indicating a wind velocity vector of wind force that may act on the ship, and an estimator configured to receive the plurality of parameter data outputted from the data outputter, estimate values corresponding to the respective parameter data to be log velocity vectors of the ship, and output the log velocity vectors as first output values. The rotational speed data included in the plurality of parameter data indicate different rotational speeds, and the wind velocity vector data included in the plurality of parameter data indicate the same wind velocity vector. Each of the first output values is estimated and outputted as the log velocity vector of the ship when the wind velocity vector indicated by the wind velocity vector data acts on the ship.

(3) The estimator may be configured using a neural network. The estimator may have at least two input gates, respectively configured to receive one of the rotational speed data and the wind velocity vector data, and an output gate configured to output the first output value. Values outputted from the input gates of the neural network may be multiplied by a coupling coefficient and then transmitted to the output gate.

(4) The ship characteristic estimating device may further include a ground velocity calculator configured to calculate a ground velocity vector of the ship traveling on water, a propeller speed detector configured to detect the rotational speed of the propeller, and a vane anemometer equipped in the ship and configured to measure the wind velocity vector of the wind force against the ship. Each of the input gates may receive one of the rotational speed of the propeller detected by the propeller speed detector, and the wind velocity vector measured by the vane anemometer. The output gate may estimate, as the log velocity vector of the ship, a value corresponding to a condition defined by a combination of the rotational speed of the propeller detected by the propeller speed detector and the wind velocity vector measured by the vane anemometer, and output the value as a second output value. The device may further include an updater configured to compare the second output value with the ground velocity vector calculated as a teaching signal by the ground velocity calculator, and update the coupling coefficient to reduce an error between the second output value and the teaching signal.

(5) The estimator may have a memory including a plurality of cells respectively configured to store the ground velocity vector of the ship under one of a plurality of conditions defined by a combination of the rotational speed of the propeller of the ship and the wind velocity vector of the wind force against the ship for every one of the plurality of conditions, and the estimator may output, as the first output value, an average value of the ground velocity vectors stored in the cells specified by the condition corresponding to the combination of the rotational speed data and the wind velocity vector data included in the received parameter data.

(6) The ship characteristic estimating device may further include a ground velocity calculator configured to calculate a ground velocity vector of the ship traveling on water, a propeller speed detector configured to detect the rotational speed of the propeller, and a vane anemometer equipped in the ship and configured to measure the wind velocity vector of the wind force against the ship. The estimator may further include an updating module configured to store the ground velocity vector calculated by the ground velocity calculator in the cell specified by a combination of the rotational speed detected by the propeller speed detector and the wind velocity vector measured by the vane anemometer when data required for calculating the ground velocity vector is acquired.

(7) The ship characteristic estimating device may further include a display configured to display a range where the ship is predicted to be located therein after a particular period of time from a current time point, based on the first output value outputted from the estimator.

(8) To solve the above problems, according to another aspect of the present disclosure, an autopilot system is provided. The system includes a GNSS signal receiver equipped in a ship and configured to receive GNSS signals, and a controller configured to control a rudder angle of the ship based on positional information of the ship that is calculated based on GNSS signals received by the GNSS signal receiver, and further includes any one of the ship characteristic estimating device described above. The controller controls the rudder angle of the ship based also on the first output value outputted from the estimator of the ship characteristic estimating device.

Effects of the Disclosure

According to this disclosure, it is possible to easily grasp a relationship of parameter values which influence a log velocity of a ship, with the log velocity of the ship caused by the parameters.

MODES FOR CARRYING OUT THE DISCLOSURE

Figure 1:
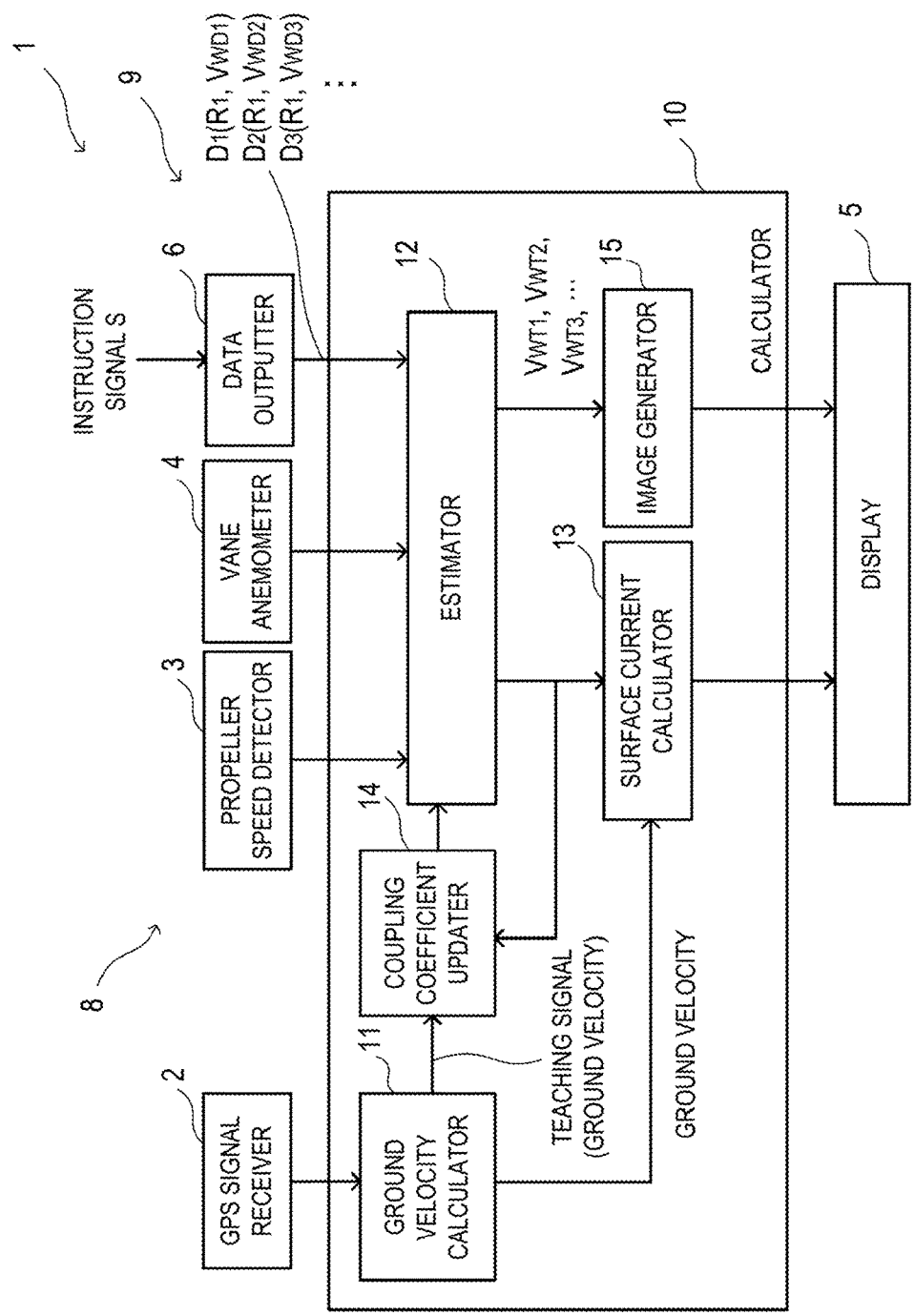
FIG. 1 is a block diagram illustrating a configuration of an estimating apparatus according to one embodiment of this disclosure.

FIG. 1 is a block diagram illustrating a configuration of an estimating apparatus 1 according to one embodiment of this disclosure. The estimating apparatus 1 is equipped in a first ship (ship) which travels on water.

As illustrated in FIG. 1, the estimating apparatus 1 includes a surface current estimating device 8 and a wind force characteristic estimating device 9 (ship characteristic estimating device). The surface current estimating device 8 is configured to estimate a direction and magnitude of a surface current at a position of the first ship, in other words, a velocity vector of the surface current at the first ship position. On the other hand, the wind force characteristic estimating device 9 is configured to estimate wind force characteristics of the first ship. Hereinafter, a configuration of the surface current estimating device 8 and a configuration of the wind force characteristic estimating device 9 are described in this order. Note that the surface current is a flow within a depth range which is about a range from a water surface to a bottom of the first ship. Further the wind force characteristics are characteristics indicating how a moving speed of the first ship changes on static water due to a bearing and magnitude of the wind force against the first ship.

Configuration of Surface Current Estimating Device

The surface current estimating device 8 automatically obtains particular parameters (in this embodiment, a rotational speed of a propeller of the first ship, a true wind speed in a bow direction, and a true wind speed in a starboard direction) at every particular timing, and calculates a surface current velocity (surface current velocity vector) at the first ship position for every condition defined by a combination of values of the respective parameters. The surface current estimating device 8 includes a GPS signal receiver 2, a propeller speed detector 3, a vane anemometer 4, one or some of components constituting a calculator 10 (e.g., a ground velocity calculator 11, an estimator 12, a surface current calculator 13, and a coupling coefficient updater 14), and a display 5.

The GPS signal receiver 2 is provided as a GNSS signal receiver configured to receive GPS signals as navigation signals (GNSS signals) which are transmitted from navigation satellites (not illustrated). The GPS signal receiver 2 includes a GPS antenna, for example. The GPS signals received by the GPS signal receiver 2 (i.e., positional information of the first ship) are notified to the calculator 10 along with a received time point of the GPS signals.

Note that in this embodiment, the GPS signal receiver 2 is used as the GNSS signal receiver; however, without limiting to this, a receiver used in another GNSS system may be used. Here, GNSS is an abbreviation of Global Navigation Satellite Systems. This GNSS is a collective name for "GPS" administrated by the United States of America, "GALILEO" administrated by the European Union, "GLONASS" administrated by Russia, etc.

The propeller speed detector 3 detects a rotational speed per unit time of the propeller configured to produce a propulsion force (thrust) of the first ship, and includes a sensor capable of detecting a rotational speed, for example. The rotational speed detected by the propeller speed detector 3 is notified to the calculator 10.

The vane anemometer 4 measures, as information of a wind direction and speed, the true wind speed in the bow direction and the true wind speed in the starboard direction. The vane anemometer 4 is disposed in the first ship where the surface current estimating device 8 according to this embodiment is equipped, at a location with no obstacle in its surrounding which blocks wind. The true wind speed in the bow direction and the true wind speed in the starboard direction measured by the vane anemometer 4 are notified to the calculator 10.

The calculator 10 is configured to estimate a surface current at the first ship position (target location) at every particular timing, based on the various information notified by the GPS signal receiver 2, the propeller speed detector 3, and the vane anemometer 4. The calculator 10 includes the ground velocity calculator 11, the estimator 12, the surface current calculator 13, and the coupling coefficient updater 14. Note that, although it is described later in detail, the calculator 10 is configured to also estimate the wind force characteristics based on the parameters outputted from a data outputter 6.

The ground velocity calculator 11 calculates a ground velocity (ground velocity vector) of the first ship based on the positional information of the first ship and the acquired time point of the first ship positional information, which are notified from the GPS signal receiver 2. Specifically, the ground velocity calculator 11 calculates the ground velocity of the first ship based on first ship positions of at least two timings and acquired time points of the positional information of the respective first ship positions. The ground velocity calculator 11 notifies the ground velocity calculated as above, to the surface current calculator 13 and the coupling coefficient updater 14.

The estimator 12 is configured to estimate a log velocity of the first ship. In this embodiment, the estimator 12 receives the rotational speed of the propeller of the first ship, which is detected by the propeller speed detector 3, and the true wind speed in the bow direction and the true wind speed in the starboard direction, which are measured by the vane anemometer. The estimator 12 outputs to the surface current calculator 13 a value corresponding to a condition defined by a combination of these input values (a condition defined by a combination of a certain rotational speed, a certain true wind speed in the bow direction, and a certain true wind speed in the starboard direction) as the log velocity (log velocity vector, which is a log velocity in the bow direction and a log velocity in the starboard direction in this embodiment). Note that, although it is described later in detail, the estimator 12 also receives the parameter data outputted from the data outputter 6, and the estimator 12 outputs a value corresponding thereto to an image generator 15 as the log velocity.

Figure 2:
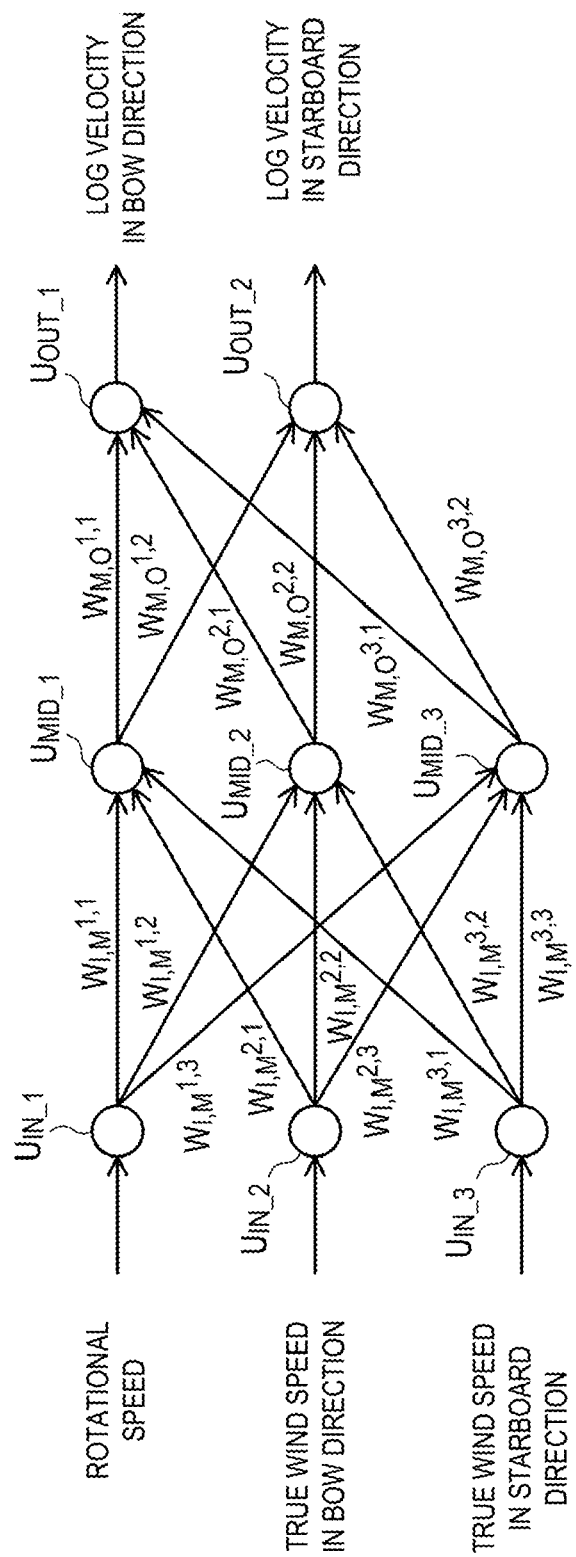
FIG. 2 is a schematic view illustrating one example of a configuration of an estimator illustrated in FIG. 1.

FIG. 2 is a schematic view illustrating one example of a configuration of the estimator 12. In this embodiment, the estimator 12 is configured using a commonly-known neural network. For example, the estimator 12 includes a plurality of input gates $U_{IN\_1}$, $U_{IN\_2}$ and $U_{IN\_3}$ structuring an input layer, a plurality of middle units $U_{MID\_1}$, $U_{MID\_2}$ and $U_{MID\_3}$ structuring a hidden layer, and a plurality of output gates $U_{OUT\_1}$ and $U_{OUT\_2}$ structuring an output layer. Note that, the configuration of the estimator 12 illustrated in FIG. 2 is merely an example, and the number of units in each layer, the number of hidden layers are not limited to those illustrated in FIG. 2.

In the estimator 12, when the input values (the rotational speed of the propeller, etc.) are inputted into the respective input gates $U_{IN\_1}$, $U_{IN\_2}$ and $U_{IN\_3}$, each of those input values is multiplied by a coupling coefficient $W_{I,M}$ and outputted to the middle units $U_{MID\_1}$, $U_{MID\_2}$ and $U_{MID\_3}$ of the hidden layer. Each of the middle units $U_{MID\_1}$, $U_{MID\_2}$ and $U_{MID\_3}$ of the hidden layer adds up the inputted values to obtain a total, multiplies by a coupling coefficient $W_{M,O}$ a value obtained based on the total value, and outputs it to the output gates $U_{OUT\_1}$ and $U_{OUT\_2}$. Each of the output gates $U_{OUT\_1}$ and $U_{OUT\_2}$ adds up the inputted values to obtain a total, and outputs, as a second output value, a value obtained based on the total value, to the surface current calculator 13 and the coupling coefficient updater 14. Note that, the values inputted into the estimator 12 are not necessarily the values of the parameter themselves, such as the rotational speed of the propeller, etc., and they may be numerical values which are in a one-to-one relationship with those parameters, respectively (e.g., a voltage value which changes in proportion to the rotational speed), etc.

In an initial state of the estimator 12, a suitable initial value is set for each coupling coefficient W. Further, the coupling coefficient W is updated by the coupling coefficient updater 14 as needed. For example, the coupling coefficient W is updated by the coupling coefficient updater 14 to reduce an error of each second output value outputted from the estimator 12 with respect to the ground velocity (teaching signal) calculated by the ground velocity calculator 11. Thus, the second output value outputted from the estimator 12, although described later in detail, is converged to the log velocity of the first ship every time the coupling coefficient W is updated.

The surface current calculator 13 calculates a surface current velocity (surface current velocity vector) that is a velocity of a surface current, based on the second output values as the log velocity outputted from the estimator 12 and the ground velocity calculated by the ground velocity calculator 11. For example, the surface current calculator 13 calculates the surface current velocity by subtracting the log velocity from the ground velocity.

Figure 3:
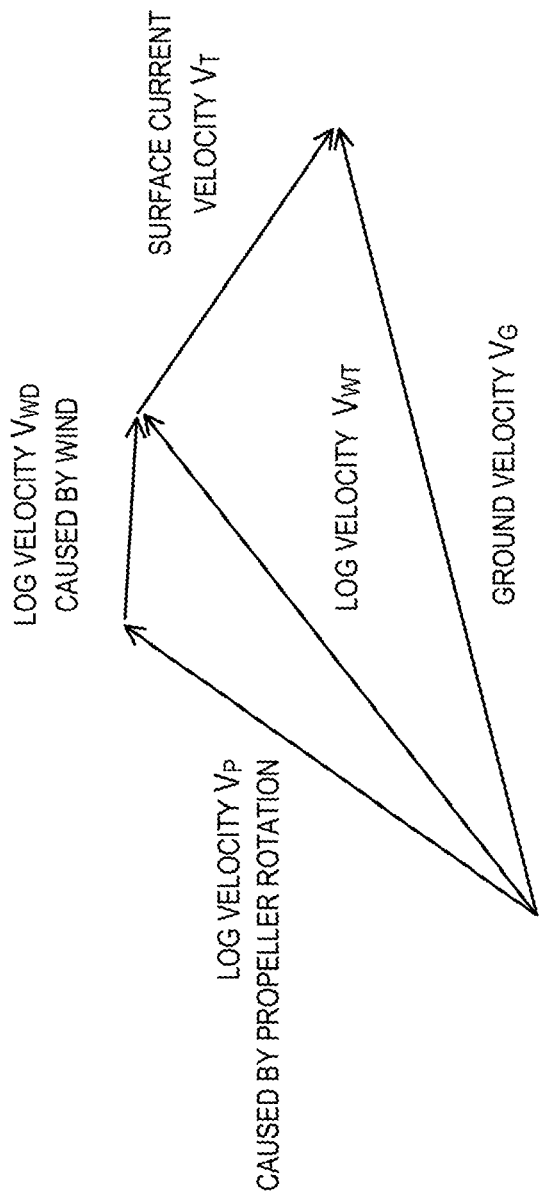
FIG. 3 is a vector diagram illustrating a relationship of a ground velocity, a log velocity, and a surface current velocity.

FIG. 3 is a vector diagram illustrating a relationship among the ground velocity vector $V_G$, the log velocity vector $V_{WT}$, and the surface current velocity vector $V_T$. The ground velocity $V_G$ is a velocity over a ground surface, and the log velocity $V_W$ is a velocity over a water surface (sea surface). Further, the surface current is a water current in a surface zone of the sea. Therefore, the relationship among the ground velocity vector $V_G$, the log velocity vector $V_{WT}$, and the surface current velocity vector $V_T$ may be expressed as illustrated in FIG. 3. Thus, the surface current calculator 13 subtracts the log velocity $V_W$ from the ground velocity $V_G$ as described above to calculate the surface current velocity $V_T$.

The coupling coefficient updater 14 updates each coupling coefficient W of the estimator 12 to reduce the error of each second output value from the estimator 12 with respect to the ground velocity (teaching signal) calculated by the ground velocity calculator 11. The coupling coefficient updater 14 updates the coupling coefficient W by using a backpropagation method, for example.

The display 5 displays the direction and magnitude of the surface current calculated by the surface current calculator 13, which enables a user to learn the velocity of the surface current at the first ship position.

Regarding Second Output Values from Estimator

Figure 4:
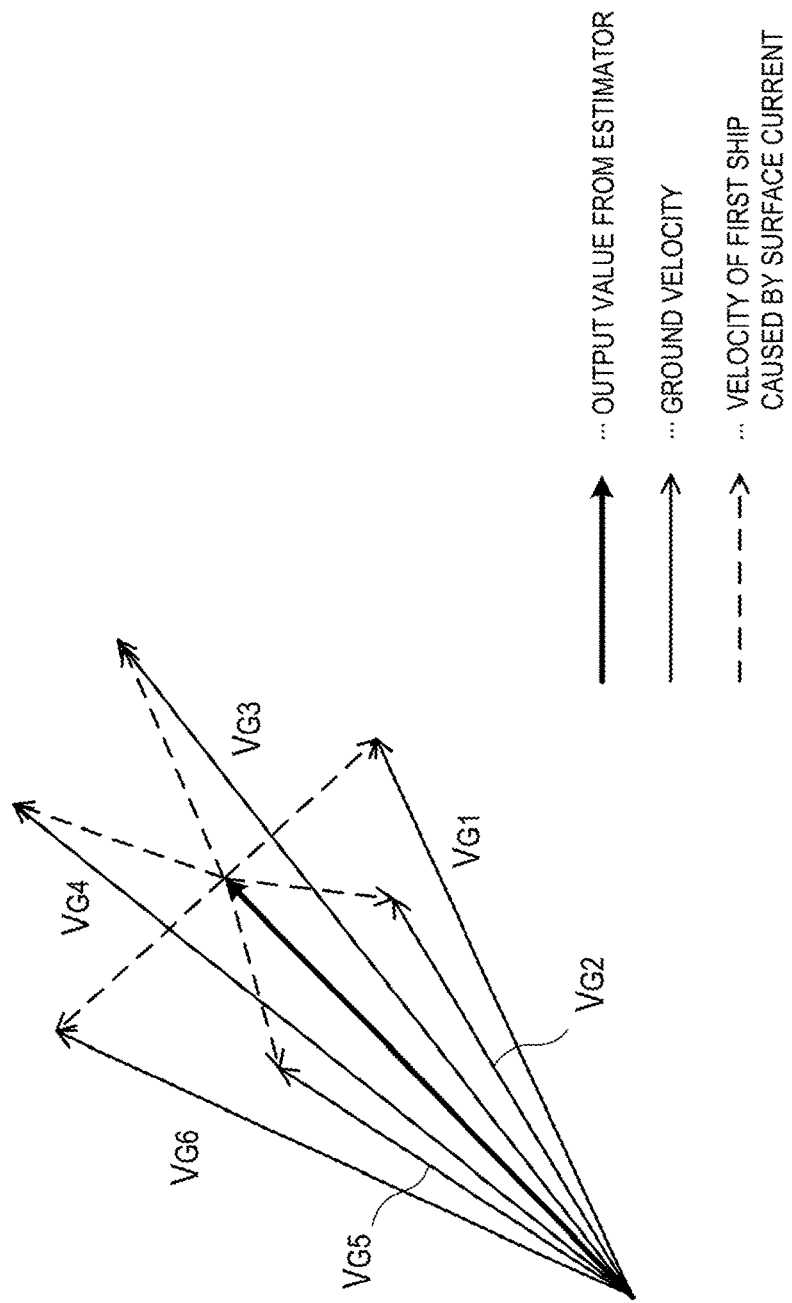
FIG. 4 is a view illustrating how a second output value from the estimator illustrated in FIG. 1 converges to the log velocity.

FIG. 4 is a view illustrating how each second output value from the estimator 12 converges to the log velocity every time the coupling coefficient W of the estimator 12 is updated. As described above, each coupling coefficient W stored in the estimator 12 is updated by the coupling coefficient updater 14 to reduce the error of the output value, which is outputted from the estimator 12 as needed, with respect to the ground velocity as the teaching signal calculated as needed.

The surface current varies in magnitude and direction depending on a marine area, time, a meteorological condition, etc. Thus, when the log velocity is the same (i.e., when the rotational speed of the propeller, the true wind speed in the bow direction, and the true wind speed in the starboard direction are the same), the ground velocity is considered to contain components of surface current velocities of various magnitudes and directions. Therefore, by averaging these components (averaging $V_{G1}$ to $V_{G6}$ in the case of FIG. 4), the surface current velocity components cancel out each other and the log velocity component remains. In other words, as the coupling coefficient W of the estimator 12 is updated to reduce the error of the second output value of the estimator 12 with respect to the ground velocity as described above, an influence of the surface current velocity components contained in the ground velocity gradually becomes smaller; therefore, the second output value of the estimator 12 converges to the log velocity. Thus, in a stage where the learning data (ground velocity data) is sufficiently obtained and the learning process has sufficiently progressed (i.e., in a stage where the coupling coefficient has been updated a sufficient number of times), the second output value from the estimator 12 can be estimated as the log velocity.

With the surface current estimating device 8, at every particular timing during travel of the first ship, the rotational speed is detected by the propeller speed detector 3, and the true wind speed in the bow direction and the true wind speed in the starboard direction are measured by the vane anemometer 4, and these information are outputted to the estimator 12 as needed. The estimator 12 generates the second output value based on these information by using the coupling coefficient W updated as needed during travel of the first ship.

Configuration of Wind Force Characteristic Estimating Device

The wind force characteristic estimating device 9 includes the GPS signal receiver 2, the propeller speed detector 3, the vane anemometer 4, the data outputter 6, one or some of the components constituting the calculator 10 (e.g., the ground velocity calculator 11, the estimator 12, the coupling coefficient updater 14, and the image generator 15), and the display 5. Since the configurations and operations of the GPS signal receiver 2, the propeller speed detector 3, and the vane anemometer 4 are similar to the case of the surface current estimating device 8 described above, the description thereof is omitted.

Once the data outputter 6 receives an instruction signal which is a signal to cause derivation of the wind force characteristics of the first ship, it sequentially outputs a plurality of parameter data Dn (n=1, 2, ...) to the estimator 12. Each parameter data Dn includes rotational speed data $R_1$ indicating the rotational speed of the propeller and wind velocity vector data $V_{WDn}$ (n=1, 2, ...) indicating a wind velocity vector. The rotational speed data $R_1$ of the parameter data Dn indicate the same rotational speed, whereas the wind velocity vector data $V_{WDn}$ of the parameter data Dn indicate different wind velocity vectors. In this embodiment, the data outputter 6 outputs the true wind speed in the bow direction and the true wind speed in the starboard direction, as the wind velocity vector data $V_{WDn}$.

Note that, the instruction signal S described above is, for example, outputted to the data outputter 6 upon a suitable operation by a user on a control panel (not illustrated) provided to the estimating apparatus 1. Here, the user may input a value of a desirable rotational speed $R_1$ through the control panel, for example.

The calculator 10 is configured to estimate the wind force characteristics based on the parameter data Dn outputted from the data outputter 6 as described above. Note that since the configurations and operations of the ground velocity calculator 11 and the coupling coefficient updater 14 of calculator 10 are similar to the case of the surface current estimating device 8 described above, the description thereof is omitted.

As described above, the estimator 12 is configured to estimate the log velocity of the first ship. The estimator 12 receives the parameter data Dn outputted from the data outputter 6, estimates values corresponding thereto to be log velocities $V_{WTn}$ (n=1, 2, ...) (in this embodiment, the true wind speed in the bow direction and the true wind speed in the starboard direction), and outputs to the image generator 15 the log velocities $V_{WTn}$ as first output values.

Figure 5:
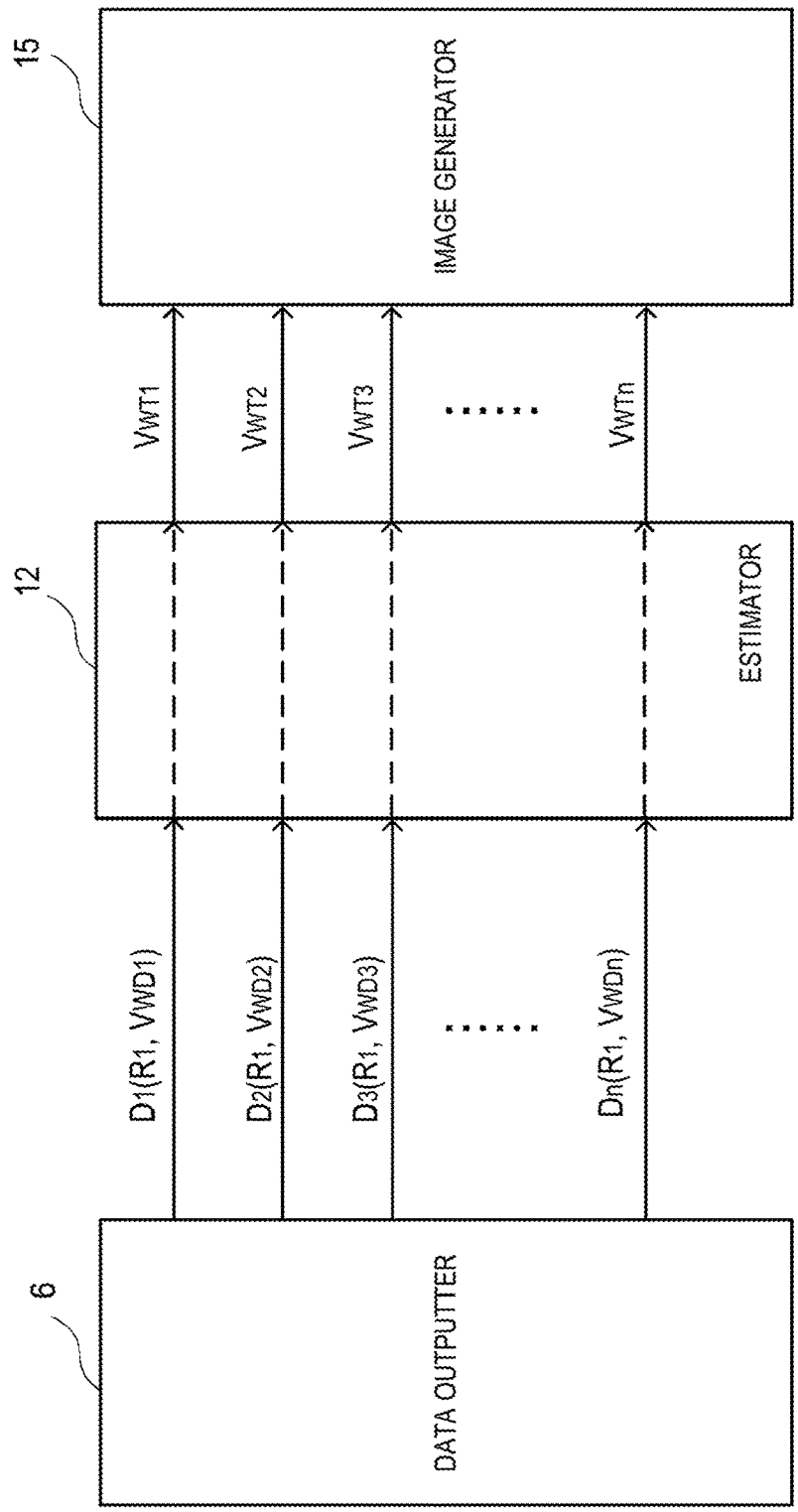
FIG. 5 is a view illustrating a correspondence of a plurality of parameter data outputted from a data outputter illustrated in FIG. 1, with log velocities estimated based on the parameter data by the estimator, respectively.

Moreover the estimator 12 receives the plurality of parameter data Dn as described above. Further the rotational speed data $R_1$ of the parameter data Dn indicate the same rotational speed, and the wind velocity vector data $V_{WTn}$ of the parameter data Dn indicate different wind velocity vectors. Thus, the log velocities $V_{WTn}$ in a case where the rotational speed of the propeller is fixed and different forces of wind act on the first ship from different bearings are outputted as the first output values by the estimator 12. FIG. 5 is a view illustrating a correspondence of the plurality of parameter data Dn outputted from the data outputter 6, with the log velocities $V_{WTn}$ (first output values) estimated based on the parameter data Dn by the estimator 12, respectively.

Figure 6:
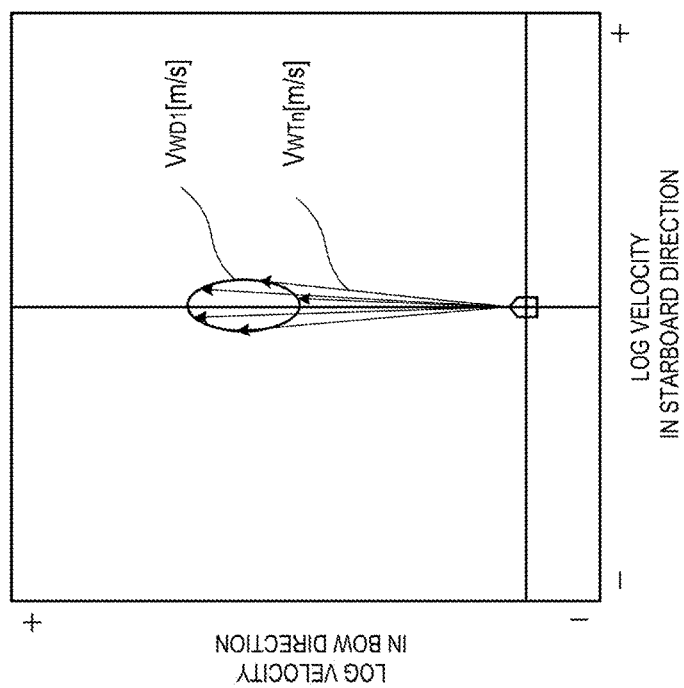
FIG. 6 is a view illustrating a generation process of a wind force characteristic chart generated by an image generator illustrated in FIG. 1.

FIG. 6 is a view illustrating a generation process of a wind force characteristic chart generated by the image generator 15. For example, the image generator 15 generates a closed curve by connecting terminal points of two or more log velocities $V_{WTn}$ which are estimated with the wind velocity vector $V_{WDn}$ of the same magnitude, among a plurality of log velocities $V_{WTn}$ (n=1, 2, . . . ) originated at the same position (see FIG. 6). Note that, FIG. 6 only illustrates the plurality of log velocities $V_{WTn}$ of which magnitudes of the wind velocity vectors $V_{WDn}$ are same so as to avoid the drawing from becoming complex.

Figure 7:
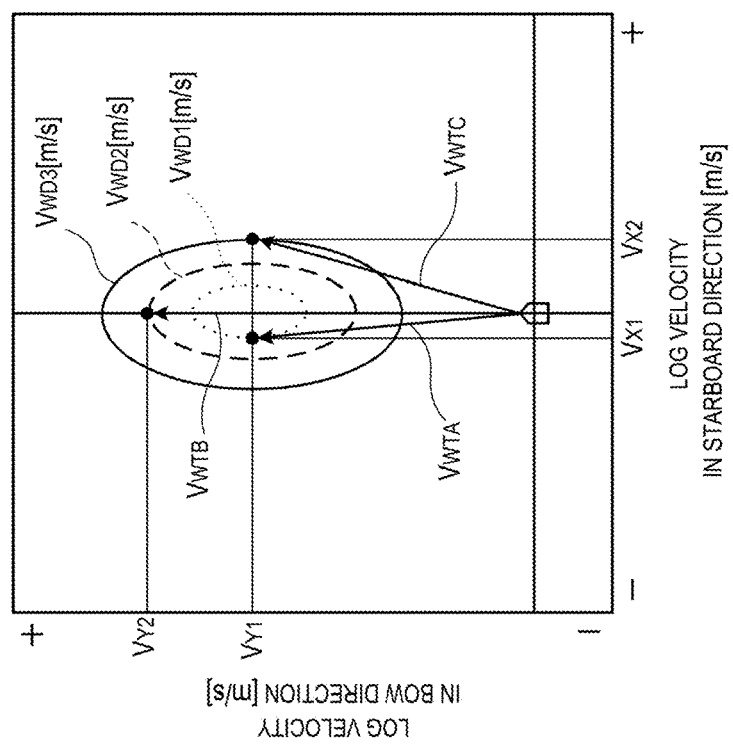
FIG. 7 is a view illustrating one example of the wind force characteristic chart generated by the image generator.

FIG. 7 is a view illustrating one example of the wind force characteristic chart generated by the image generator 15. According to the wind force characteristic chart illustrated in FIG. 7, for example, since the log velocity vector of the first ship in a case where wind of $V_{WD1}$ [m/s] acts on the first ship from a right direction thereof is $V_{WTA}$, it is understood that the log velocity of the first ship in the starboard direction is $_{VX1}$ [m/s] and the log velocity of the first ship in the bow direction is $V_{Y1}$ [m/s]. Further, since the log velocity vector of the first ship in a case where wind of $V_{WD2}$ [m/s] acts on the first ship from a rear direction thereof is $V_{WTB}$, it is understood that the log velocity of the first ship in the starboard direction is 0 [m/s] and the log velocity of the first ship in the bow direction is $V_{Y2}$ [m/s]. Moreover, since the log velocity vector of the first ship in a case where wind of $V_{WD3}$ [m/s] acts on the first ship from a left direction thereof is $V_{WTC}$, it is understood that the log velocity of the first ship in the starboard direction is $V_{X2}$ [m/s] and the log velocity of the first ship in the bow direction is $V_{Y1}$ [m/s].

In other words, according to this wind force characteristic chart, it is easily understood visually a substantial magnitude of the log velocity of the first ship due to the influence of wind when the rotational speed of the propeller of the first ship is fixed.

Effects

As described above, with the wind force characteristic estimating device 9 of the estimating apparatus 1 according to this embodiment, when the first ship travels with a certain fixed rotational speed, it is possible to estimate a change of the log velocity of the first ship due to the wind force which may act on the first ship.

Therefore, according to the wind force characteristic estimating device 9, it is possible to easily grasp the relationship between the wind velocity vector which is one of the parameters which influence the log velocity of the first ship, and the log velocity of the first ship caused by the wind velocity vector.

Further, with the wind force characteristic estimating device 9, the estimator 12 is configured by using the neural network. Thus, it is possible to suitably configure the estimator 12 capable of outputting the log velocity.

Further, with the wind force characteristic estimating device 9, the estimator 12 is updated to reduce the error of each second output value of the estimator 12 with respect to the ground velocity calculated by the ground velocity calculator 11. Thus, it is possible to configure the estimator 12 with the learning function. Additionally, since the wind force characteristic estimating device 9 is capable of accumulating a large amount of data required for estimating an accurate log velocity during the travel, it is possible to omit works of preparing these multiple learning data (data of a ground velocity under a certain condition) in advance and setting a suitable coupling coefficient based on these learning data.

Although the embodiment of this disclosure is described, this disclosure is not limited to this, and various changes may be applied without deviating from the scope of this disclosure.

Figure 8:
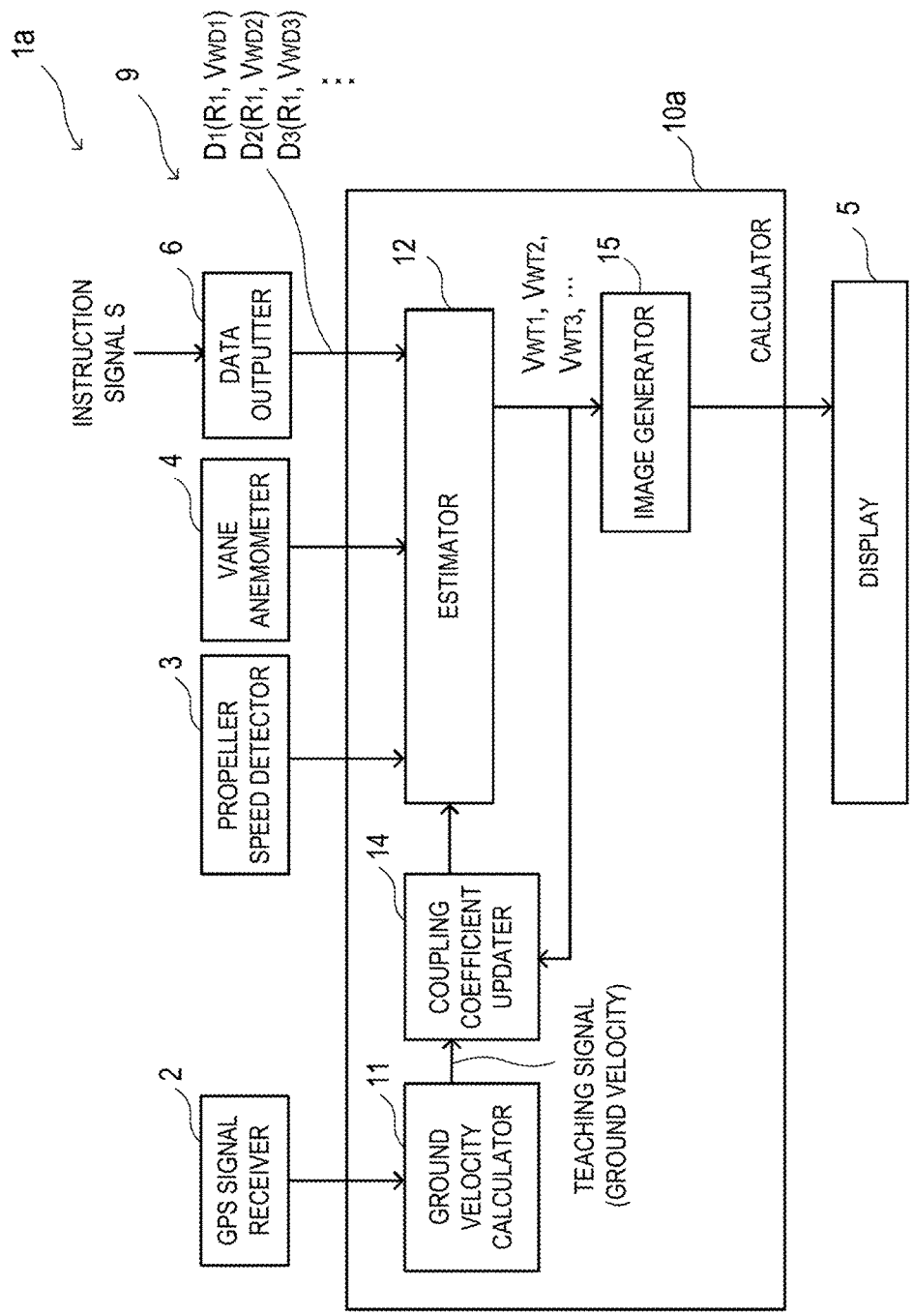
FIG. 8 is a block diagram illustrating a configuration of an estimating apparatus according to a modification.

Modifications (1) FIG. 8 is a block diagram illustrating a configuration of an estimating apparatus 1a according to a modification. A calculator 10a of the estimating apparatus 1a according to this modification is different from the calculator 10 of the embodiment described above, and has a configuration in which the surface current calculator 13 is omitted. That is, the estimating apparatus 1a according to this modification does not have a function as the surface current estimating device 8, and is provided as a wind force characteristic estimating device 9. Therefore, in accordance with the estimating apparatus 1a according to this modification, different from the case of the embodiment described above, the surface current near the first ship cannot be estimated, whereas similarly to the case of the embodiment described above, the wind force characteristics of the first ship can be estimated.

Figure 9:
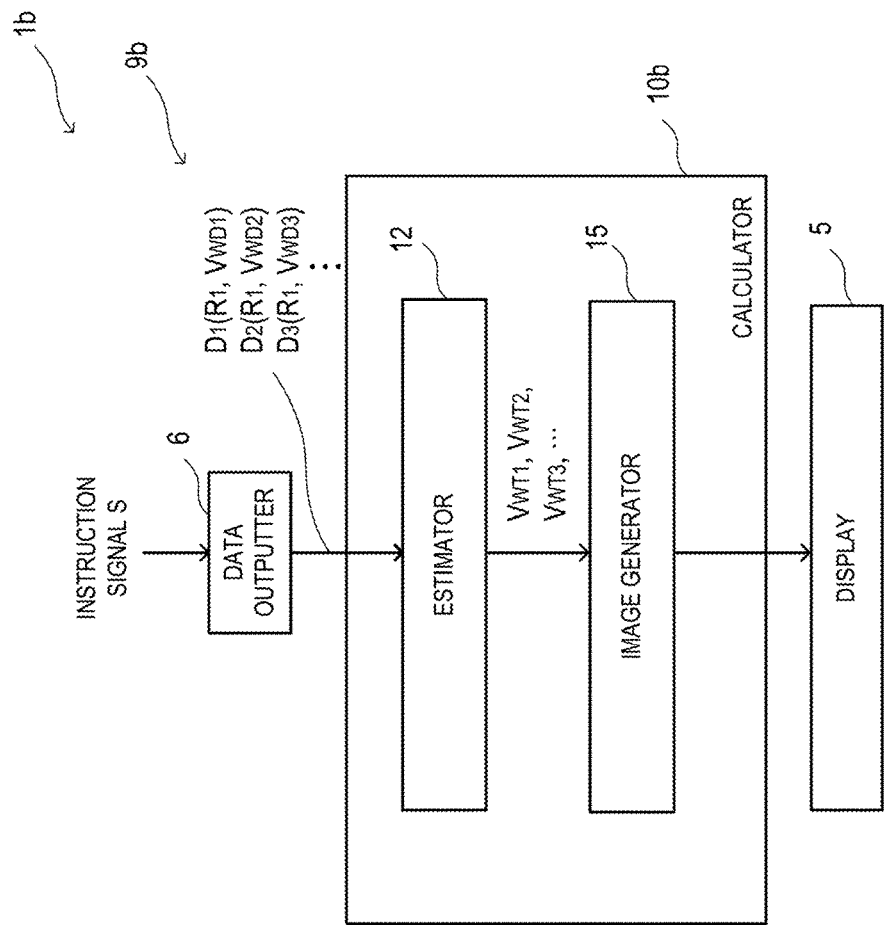
FIG. 9 is a block diagram illustrating a configuration of an estimating apparatus according to a modification.

(2) FIG. 9 is a block diagram illustrating a configuration of an estimating apparatus 1b according to a modification. The estimating apparatus 1b according to this modification is different from the estimating apparatus 1a illustrated in FIG. 8, and has a configuration in which the coupling coefficient updater 14 is omitted. That is, the estimating apparatus 1b according to this modification does not have a learning function. Further, in the configuration of the estimating apparatus 1b according to this modification, the GPS signal receiver 2, the ground velocity calculator 11, the propeller speed detector 3, and the vane anemometer 4 are also omitted.

The estimating apparatus 1b according to this modification generates the wind force characteristic chart based on the log velocity outputted from the estimator 12a of which a coupling coefficient W is determined based on many learning data acquired in advance (data of a ground velocity under a certain condition). Also with such a configuration, similar to the case of the estimating apparatus 1a illustrated in FIG. 8, it is possible to easily estimate the change of the log velocity of the first ship due to the wind force which may act on the first ship when the first ship travels with a certain fixed rotational speed.

Figure 10:
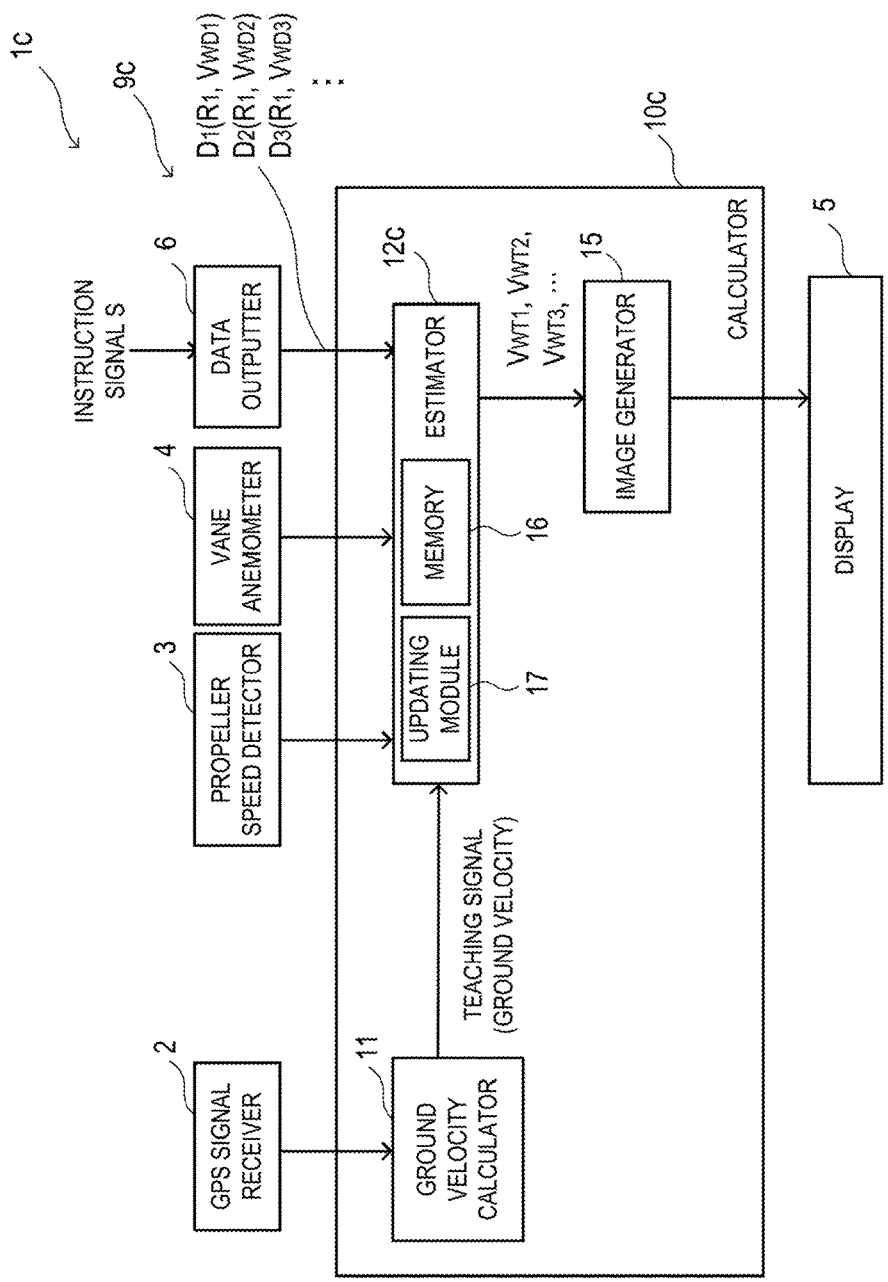
FIG. 10 is a block diagram illustrating a configuration of an estimating apparatus according to a modification.

(3) FIG. 10 is a block diagram illustrating a configuration of an estimating apparatus 1c according to a modification. Compared to the estimating apparatus 1a illustrated in FIG. 8, the estimating apparatus 1c according to this modification has a significantly different configuration for an estimator 12c. Specifically, the estimator 12c is not configured using a neural network, and has a configuration including a memory 16 and an updating module 17.

Figure 11:
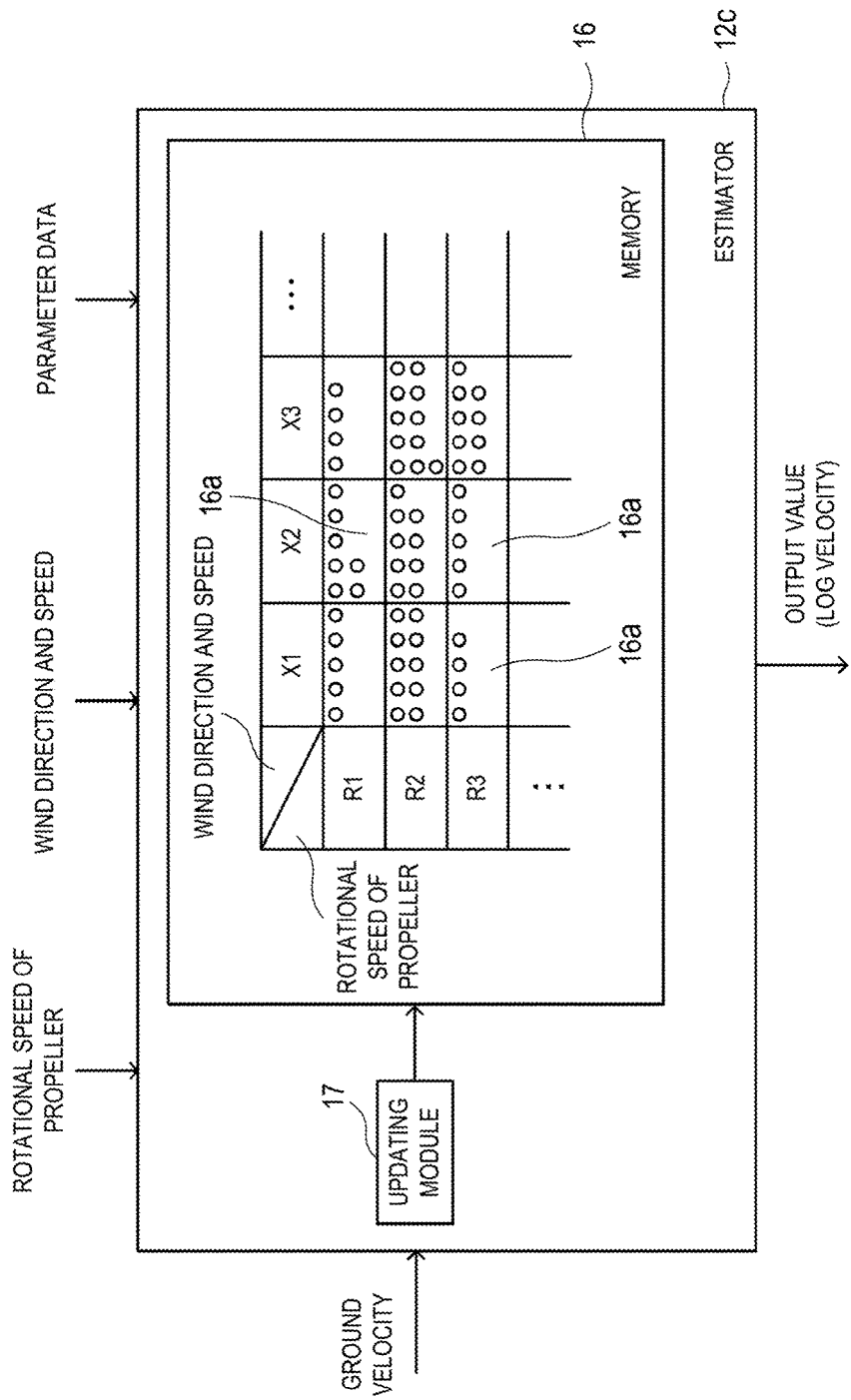
FIG. 11 is a view illustrating in detail an estimator illustrated in FIG. 10.

FIG. 11 is a view illustrating in detail the estimator 12c illustrated in FIG. 10.

The memory 16 stores a matrix table as illustrated in FIG. 11. This table stores ground velocities calculated under respective conditions (corresponding to respective cells 16a of the table). Each condition is defined by a combination of a value of a wind direction and speed (X1,X2, X3, . . . ) and a value of the rotational speed (R1, R2, R3, . . . ). In FIG. 11, a single value of ground velocity is indicated with a single circular mark. That is, the memory 16 stores, for example, five values of ground velocity calculated when the value of the wind direction and speed is X1 and the value of the rotational speed is R1.

Once the estimator 12c receives the rotational speed detected by the propeller speed detector 3 (e.g., R2) and the wind direction and speed measured by the vane anemometer 4 (e.g., X3), the estimator 12c calculates an average value of the ground velocities contained in the cell 16a where the rotational speed is R2 and the wind direction and speed is X3 (eleven values in the case of FIG. 11). Further, the estimator 12c outputs the average value as an output value.

As described above using FIG. 4, by averaging the ground velocities under a certain condition (a condition defined by a combination of a certain rotational speed and a certain wind direction and speed), surface current velocity components contained in the ground velocities cancel out each other, and thus, the average value becomes a value close to a log velocity. Therefore, also by the estimator 12c according to this modification, it is possible to appropriately estimate the log velocity.

The updating module 17 updates the table stored in the memory 16, by using a ground velocity calculated at a timing at which a rotational speed and a wind direction and speed inputted into the estimator 12c are detected. For example, the ground velocity calculated at a particular rotational speed (e.g., R3) and a particular wind direction and speed (e.g., X2) is added to a cell 16a defined by R3 and X2. By performing this operation as needed, learning data is accumulated even while traveling, and a log velocity can be estimated more accurately. In other words, the estimator 12c according to this modification also has a learning function. As a result, it is possible to derive the wind force characteristics more accurately.

Figure 12:
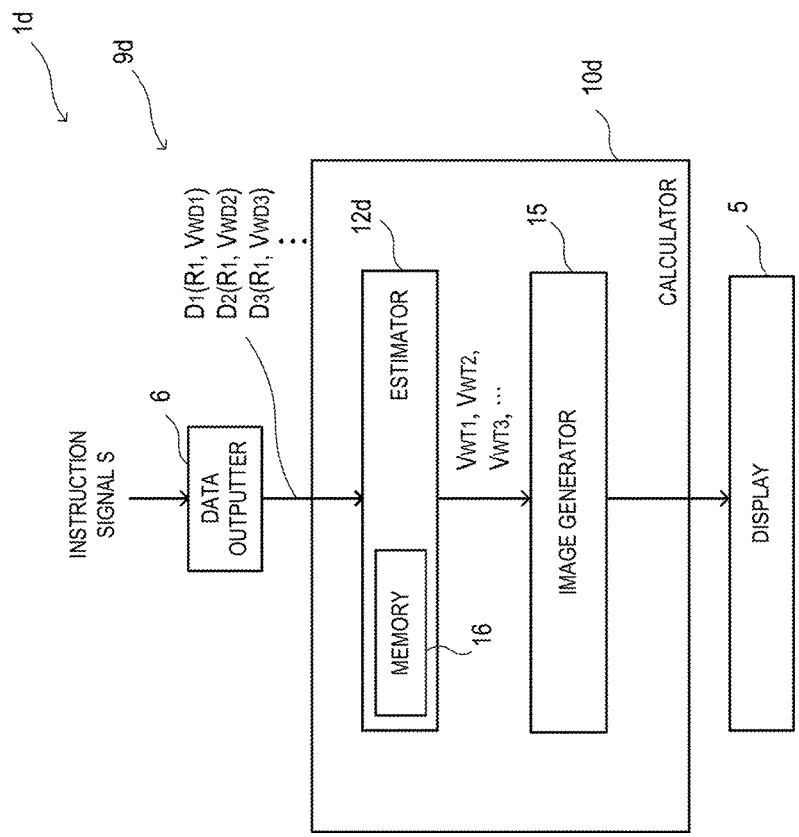
FIG. 12 is a block diagram illustrating a configuration of an estimating apparatus according to a modification.

Note that, by configuring this modification to omit the updating module 17, an estimating apparatus 1d which does not have the learning function (see FIG. 12) can be configured. In this case, a plurality of leaning data acquired in advance (each data corresponds to a single circular mark in FIG. 11) needs to be stored in the memory 16.

Figure 13:
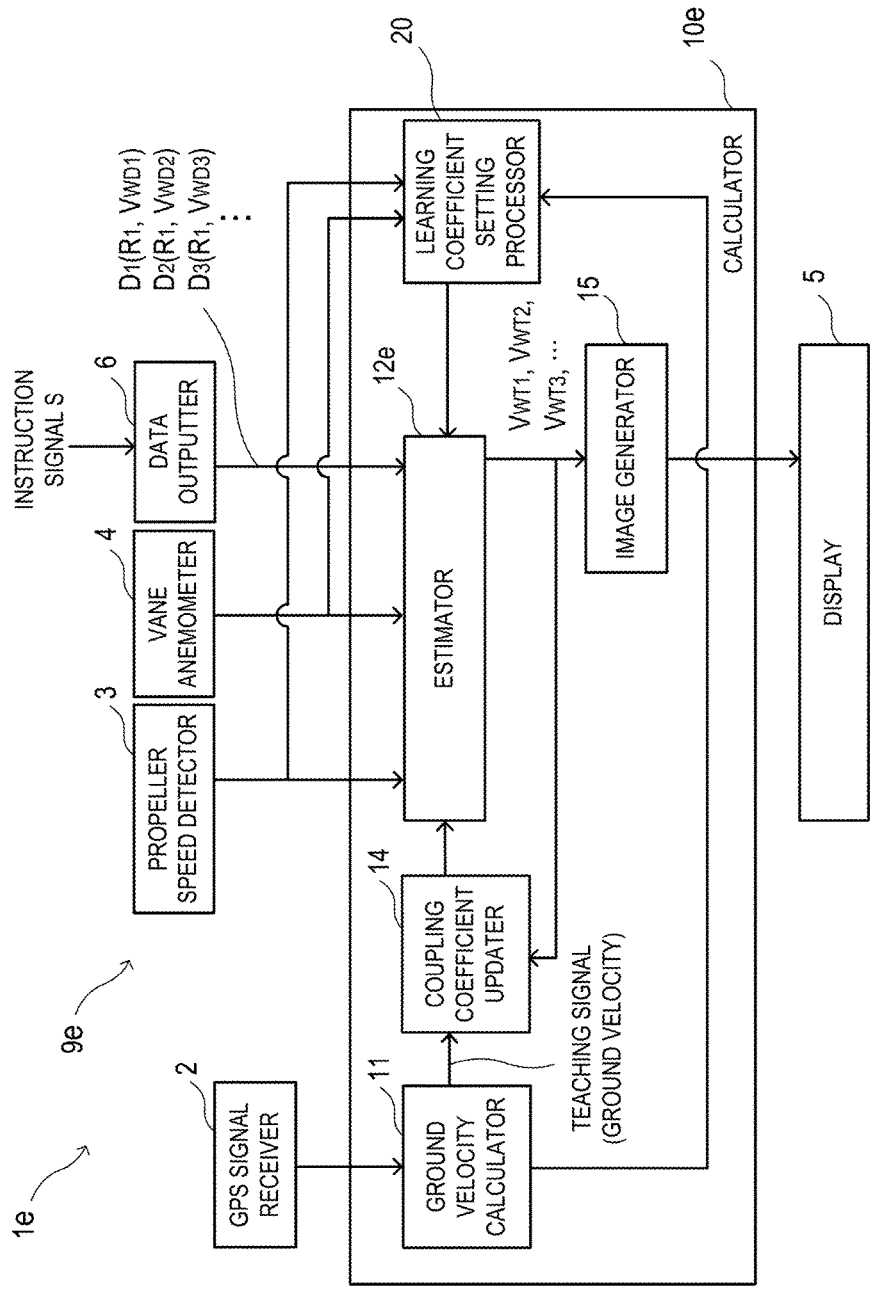
FIG. 13 is a block diagram illustrating a configuration of an estimating apparatus according to a modification.

(4) FIG. 13 is a block diagram illustrating a configuration of an estimating apparatus 1e according to a modification. The estimating apparatus 1e according to this modification has a configuration of the estimating apparatus 1a illustrated in FIG. 8, further provided with a learning coefficient setting processor 20.

An estimator 12, similar to the case of the above embodiment, is configured using a neural network and such that a coupling coefficient is updated as needed by so-called supervised learning. With the estimating apparatus 1e, an error between an output value from the estimator 12e and a teaching signal (ground velocity) is calculated. Then, the estimating apparatus 1e updates the coupling coefficient W while propagating the error as a learning signal, from a unit on an output layer side to a unit on an input layer side. A correction amount of the coupling coefficient is given by the following Equation 1.

$$\Delta W_{i,j}^{n,n-1}(t) = \eta \delta_i^n X_j^{n-1} + \alpha \Delta W_{i,j}^{n,n-1}(t-1) \quad (1)$$

In Equation 1, $\Delta W_{i,j}^{n,n-1}(t)$ is a correction amount on a weight of coupling between a unit j of an (n−1)th layer and a unit i of an n-th layer, $\eta$ is a learning coefficient, $\delta_i^n$ is a learning signal to be returned back to each unit of the (n−1)th layer from the unit i of the n-th layer, $X_j^{n-1}$ is an output value of the unit j of the (n−1)th layer, a is a stabilizing coefficient, and $\Delta W_{i,j}^{n,n-1}(t-1)$ is a previous correction amount. Note that, the (n−1)th layer is one layer on the input side of the n-th layer.

Figure 14:
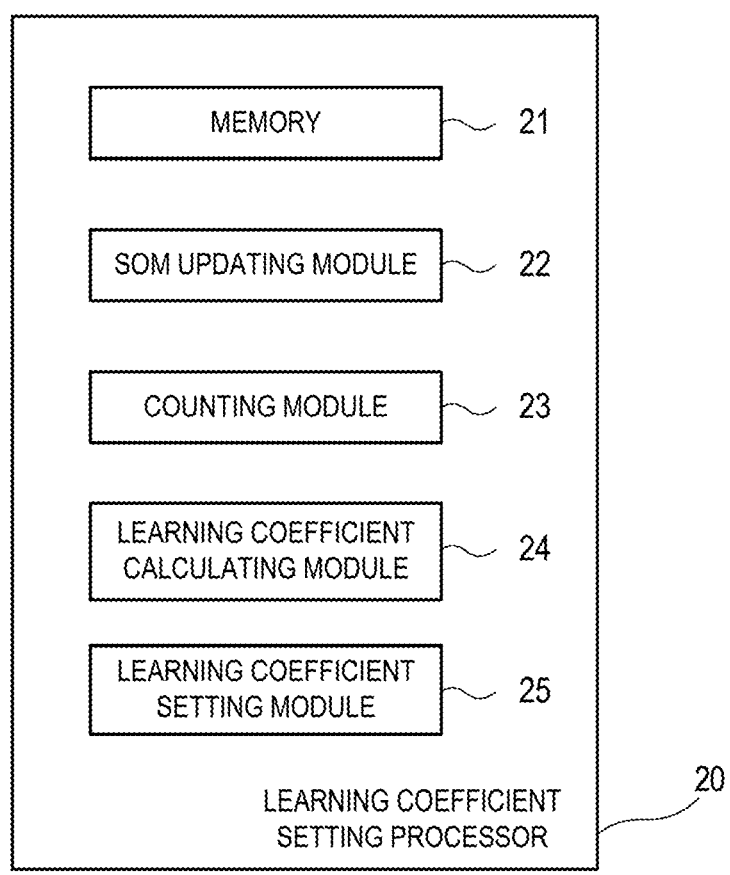
FIG. 14 is a block diagram illustrating a configuration of a learning coefficient setting processor illustrated in FIG. 13.

FIG. 14 is a block diagram illustrating a configuration of the learning coefficient setting processor 20. The learning coefficient setting processor 20 sets the learning coefficient in Equation 1 as needed. As illustrated in FIG. 14, the learning coefficient setting processor 20 has a memory 21, an SOM updating module 22, a counting module 23, a learning coefficient calculator 24, and a learning coefficient setting module 25.

Figure 15:
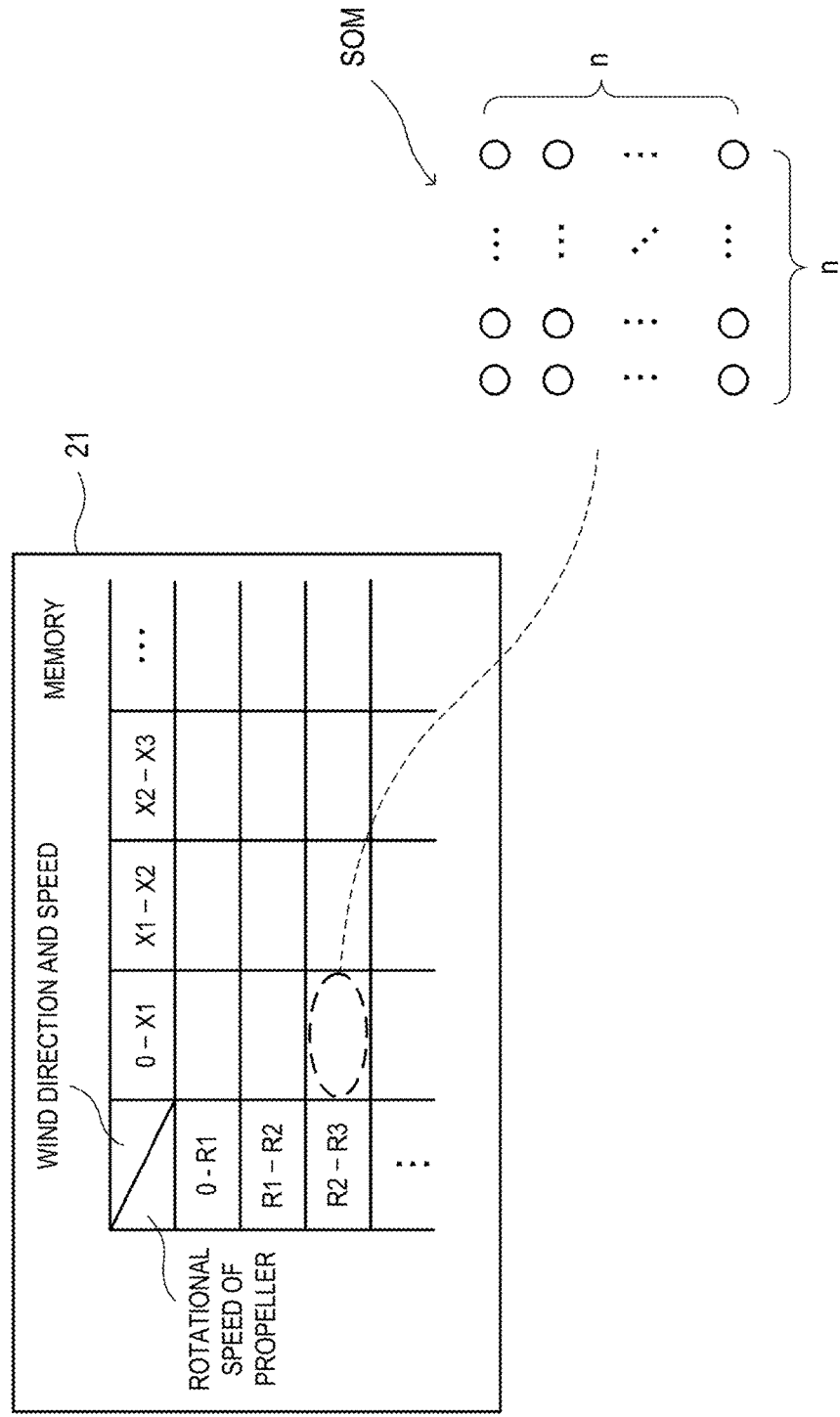
FIG. 15 is a view schematically illustrating a table stored in a memory illustrated in FIG. 14, and a self-organizing map stored in association with a plurality of cells of the table.

FIG. 15 is a view schematically illustrating a table stored in the memory 21, and a self-organizing map SOM stored in association with each cell of the table. As illustrated in FIG. 15, the memory 21 stores a table sectioned for every particular propeller rotational speed and every particular wind speed and direction in a grid pattern. Each cell of this table stores a corresponding self-organizing map SOM. Each self-organizing map SOM of this modification is a two-dimensional SOM formed with an n×n number of units. Each unit stores a reference vector of the same dimension as that of an input vector. In an initial state (a state where the learning is not performed), a suitable reference vector is set into the unit.

The SOM updating module 22 updates the SOM according to the input vector (a vector formed based on a rotational speed of the propeller, a wind direction and speed, a ground velocity, etc. which are inputted at every particular timing). Specifically, the SOM updating module 22 updates as below, the SOM stored in the cell including the inputted rotational speed and the inputted wind direction and speed.

For example, by using a unit with a shortest Euclidean distance from the input vector as a winner unit, the SOM updating module 22 updates a reference vector stored in the winner unit and reference vectors stored in units around the winner unit, based on the following Equation 2.

$$m_i(t+1) = m_i(t) + h_i(t)[x(t) - m_i(t)] \quad (2)$$

Note that, $m_i$ is the reference vector, $x(t)$ is the input vector, and $h_i$ is a neighborhood function expressed by $c \times \exp(-dis^2/\alpha^2)$. In the neighborhood function, c is a learning coefficient, and $dis = |x - m_c|$. Here, $m_c$ is a reference vector that minimizes a Euclidean distance from $x(t)$.

The SOM updating module 22 updates as needed the self-organizing map SOM by the input vector inputted as needed, by using the Equation 2 described above.

The counting module 23 counts the number of units having a reference vector of which difference (Euclidean distance) from the input vector becomes a certain threshold or below.

The learning coefficient calculator 24 calculates an inverse of the value counted by the counting module 23, to be the learning coefficient. In other words, when the count value is high (when the number of similar input data is large), the learning coefficient becomes low, and when the count value is low (when the number of similar input data is small), the learning coefficient becomes high.

The learning coefficient setting module 25 notifies to the estimator 12e the value calculated by the learning coefficient calculator 24, and sets it to be the learning coefficient $\eta$ in Equation 1. The estimator 12e updates the coupling coefficient based on Equation 1 by using the learning coefficient η, and then calculates a log velocity vector based on the updated coupling coefficient.

According to this modification, when a large number of similar learning data (input vector) is accumulated, the learning coefficient becomes low. In this case, as apparent from the Equation 1 described above, the correction amount $\Delta W_{i,j}^{n,n-1}(t)$ of the coupling coefficient becomes small. On the other hand, when the similar learning data is not accumulated or only a small number of similar learning data is accumulated, the learning coefficient becomes high. In this case, as apparent from Equation 1, the correction amount of the coupling coefficient becomes large. Thus, according to this modification, imbalance of the output values from the estimator due to the accumulation of the large number of similar learning data can be reduced.

Figure 16:
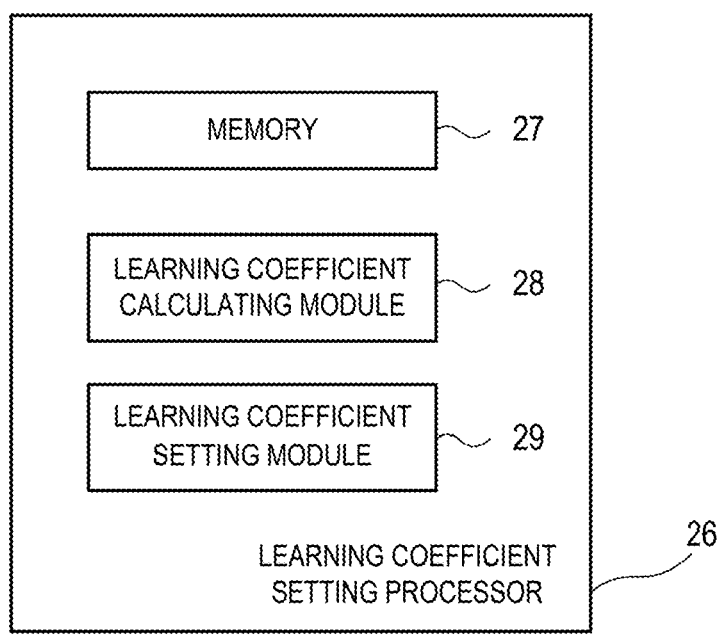
FIG. 16 is a block diagram illustrating a configuration of a learning coefficient setting processor of an estimating apparatus according to a modification.

(5) FIG. 16 is a block diagram illustrating a configuration of a learning coefficient setting processor 26 of an estimating apparatus according to a modification. Similar to the case of the learning coefficient setting processor 20 of the modification described above, the learning coefficient setting processor 26 according to this modification sets the learning coefficient η of Equation 1 which is used by an estimator configured using a neural network. However, the learning coefficient setting processor 26 according to this modification has a different configuration from the learning coefficient setting processor 20 of the modification described above. As illustrated in FIG. 16, the learning coefficient setting processor 26 of this modification has a memory 27, a learning coefficient calculator 28, and a learning coefficient setting module 29.

Figure 17:
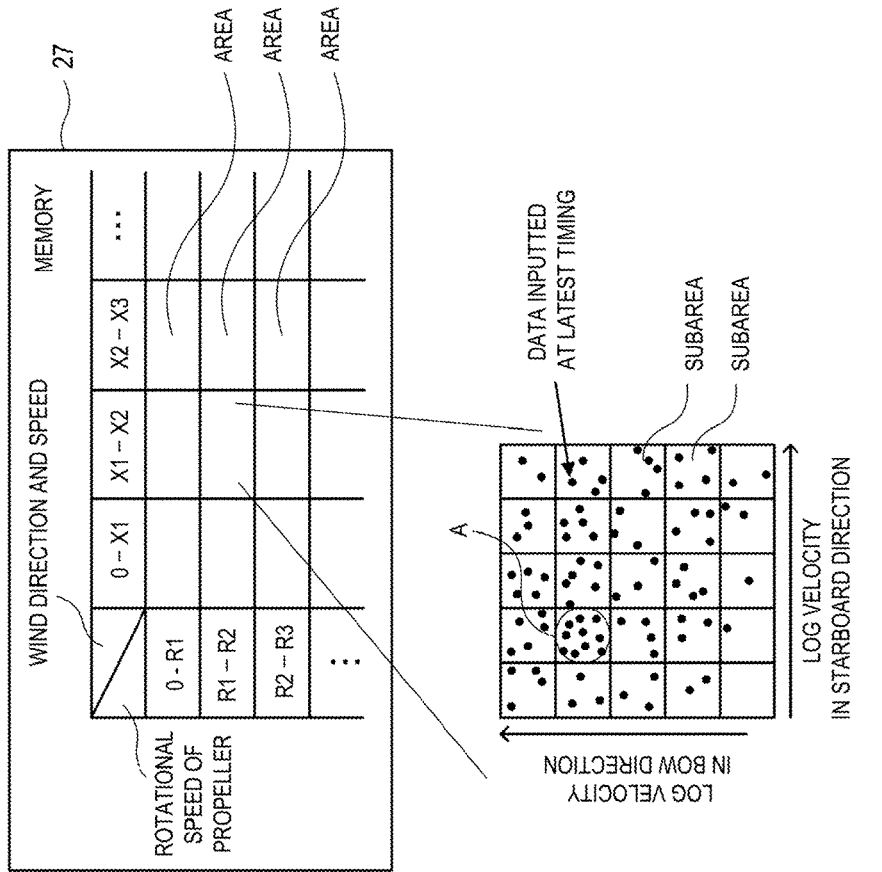
FIG. 17 is a view illustrating a table stored in a memory illustrated in FIG. 16, and learning data stored in association with each cell (each area) of the table.

FIG. 17 is a view illustrating a table stored in the memory 27, and learning data stored in association with each cell (each area) of the table. As illustrated in FIG. 17, similar to the case of the modification described above, the memory 27 stores a table sectioned for every particular propeller rotational speed and every particular wind speed and direction in a grid pattern. In this modification, the learning data stored in each area is mapped corresponding to the ground velocity of each learning data. Specifically, as illustrated in FIG. 17, in a map having a plurality of subareas sectioned for every particular ground velocity in the bow direction and every particular ground velocity in the starboard direction in a grid pattern, each learning data is mapped corresponding to the ground velocity.

The learning coefficient calculator 28 sets, as the learning coefficient, a value that is obtained by normalizing an inverse of a value calculated by dividing the number of learning data (four in the case of FIG. 17) stored in a subarea which includes learning data inputted at a latest timing, by the number of learning data stored in a subarea with a largest number of learning data (ten in a subarea A in the case of FIG. 17) among all the subareas of the area having the subarea which includes the learning data inputted at the latest timing. Further, similar to the learning coefficient setting module 25 of the above modification, the learning coefficient setting module 29 notifies to the estimator the learning coefficient set by the learning coefficient calculator 28 and sets it to be the learning coefficient η in Equation 1. Also with such a configuration, the learning coefficient can suitably be set.

Figure 18:
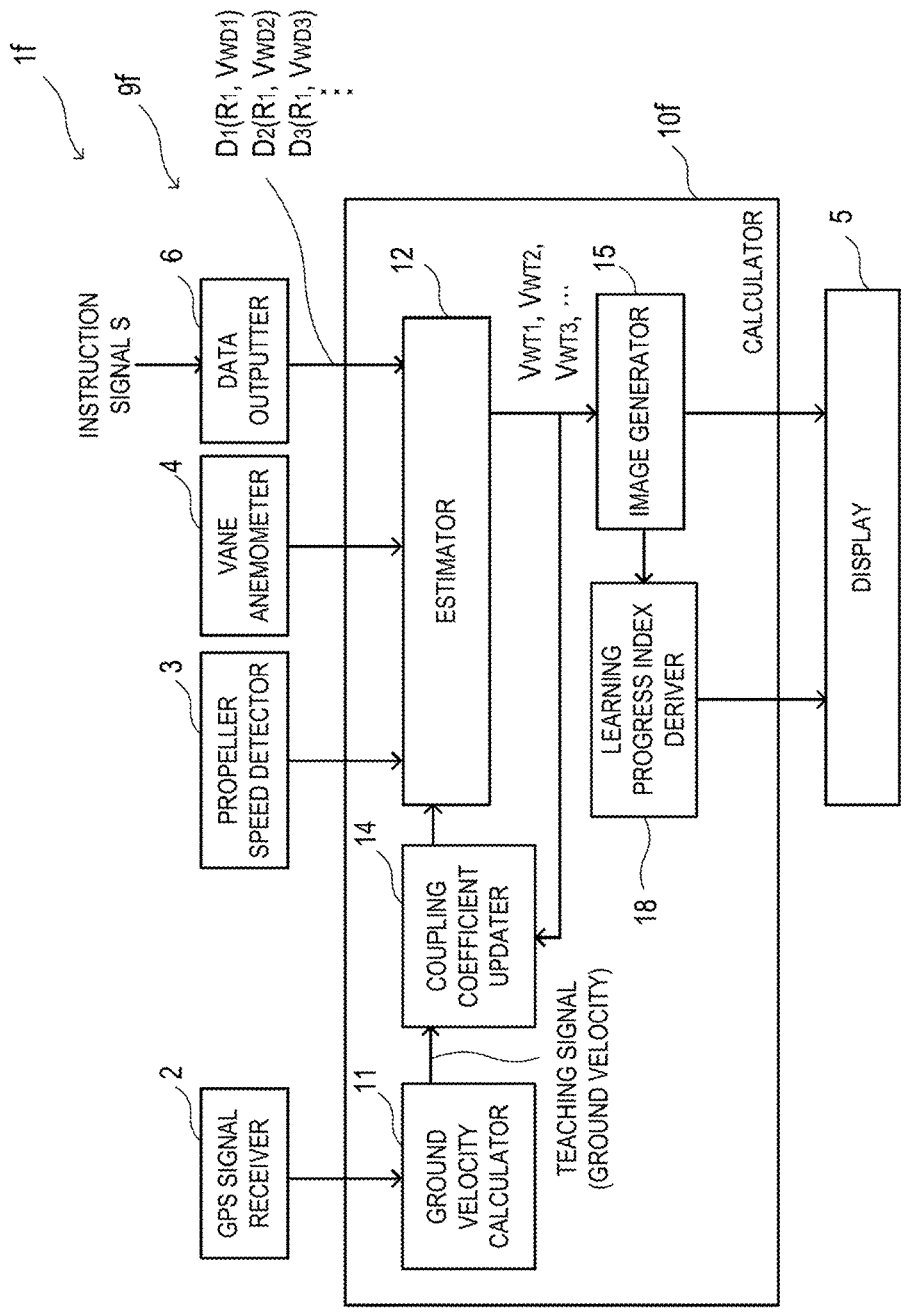
FIG. 18 is a block diagram illustrating a configuration of an estimating apparatus according to a modification.

(6) FIG. 18 is a block diagram illustrating a configuration of an estimating apparatus 1f according to a modification. The estimating apparatus 1f according to this modification has a configuration of the estimating apparatus 1a illustrated in FIG. 8, further provided with a learning progress index deriver 18.

Figure 19:
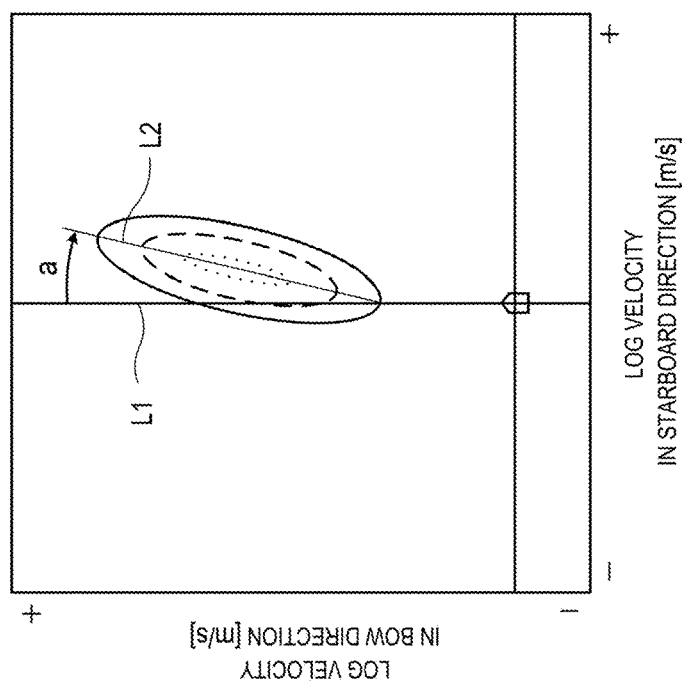
FIG. 19 is a view illustrating one example of a wind force characteristic chart generated by an image generator illustrated in FIG. 18, illustrating a deriving process of a learning progress index.

FIG. 19 is a view illustrating one example of a wind force characteristic chart generated by an image generator 15, illustrating a deriving process of a learning progress index. The learning progress index deriver 18 detects an inclination "a" of a target line L2 illustrated in FIG. 19 with respect to a line indicating a fixed log velocity in the starboard direction in FIG. 19 (reference line L1). This target line L2 is a straight line coupling a terminal point of the log velocity in a case where wind of a certain speed acts on the first ship from the rear side, to a terminal point of the log velocity in a case where wind of the certain speed acts on the first ship from the front side.

Generally, ships have a left-right symmetric structure. Therefore, it can be considered that if a sufficient number of learning data is acquired, the wind force characteristic chart becomes left-right symmetric. On the other hand, if the number of learning data is insufficient, it can be considered that the wind force characteristic chart inclines as FIG. 19 and the inclination a of the target line L2 with respect to the reference line L1 becomes sharper.

In this regard, with the estimating apparatus if according to this embodiment, the learning progress index deriver 18 detects the inclination a as described above and derives the learning progress index as an index indicating a progress degree of learning according to the degree of this inclination a. As the learning progress index, a numerical value displayed in percentage is given as an example. The learning progress index deriver 18 derives the numerical value corresponding to the degree of this inclination a. For example, when the inclination a is sharp (i.e., when the sufficient learning data is considered to have not obtained), the learning progress index deriver 18 derives a low numerical value as the learning progress index. On the other hand, when the inclination a is gentle (i.e., when the sufficient learning data is considered to have obtained), the learning progress index deriver 18 derives a high numerical value as the learning progress index. The numerical value derived as above is displayed on the display 5. It is possible for the user to look at the numerical value and quantitatively grasp reliability of the wind force characteristic chart displayed on the display 5.

Note that the learning progress index is not limited to the numerical value displayed in percentage as described above, and may be displayed in a different mode. For example, the learning progress index may be an alphabet ranked into a plurality of levels ("A" indicates high reliability, "B" indicates medium reliability, and "C" indicates low reliability). Alternatively, the learning progress index may be a color on the wind force characteristic chart displayed on the display 5 (blue indicates high reliability, yellow indicates medium reliability, and red indicates low reliability).

Figure 20:
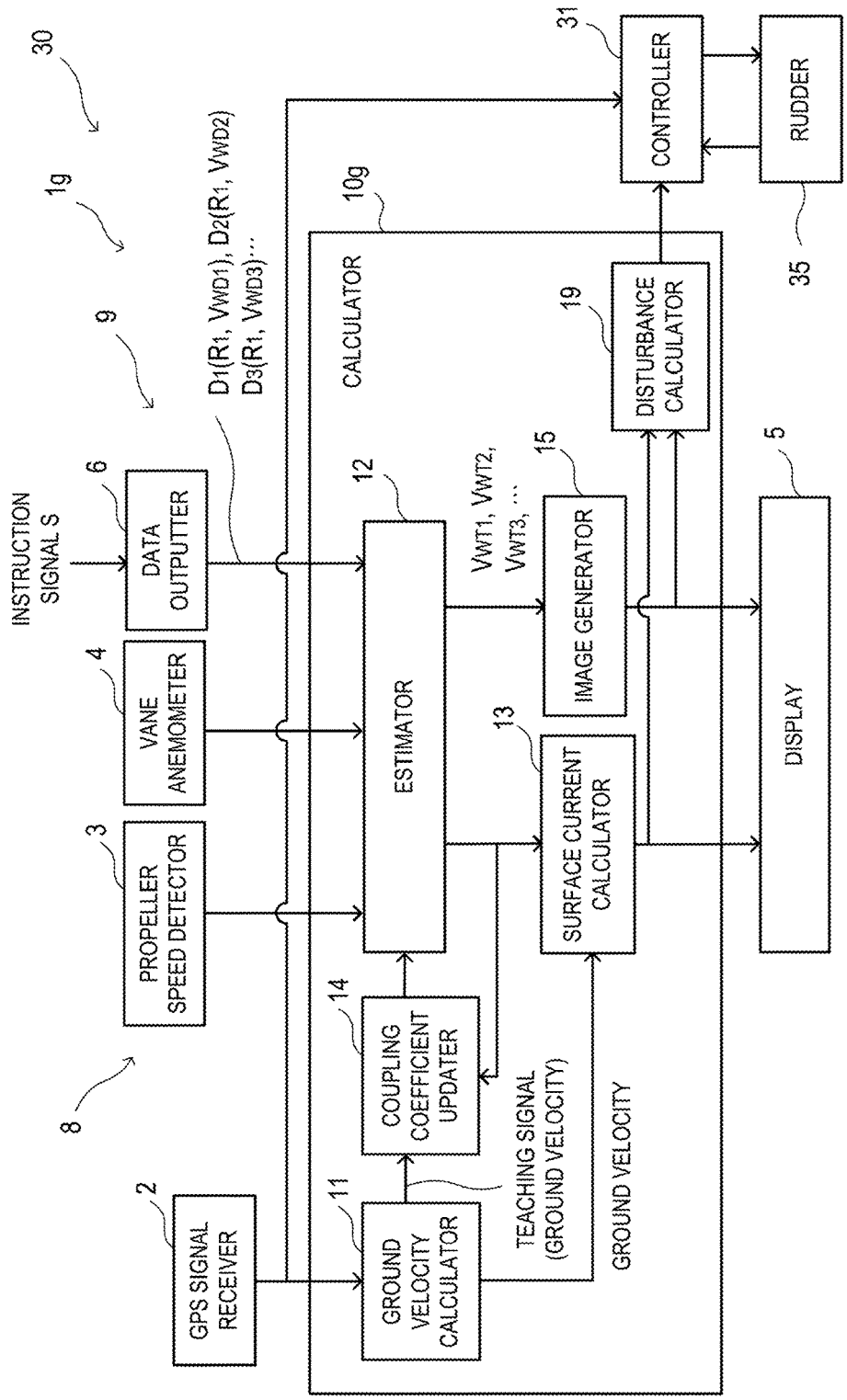
FIG. 20 is a block diagram illustrating a configuration of an autopilot system.

(7) FIG. 20 is a block diagram illustrating a configuration of an autopilot system 30. The autopilot system 30 is configured to automatically control a channel of the first ship by automatically controlling a rudder 35 of the first ship. The autopilot system 30 includes an estimating apparatus 1g and a controller 31.

The estimating apparatus 1g has a configuration of the estimating apparatus 1 illustrated in FIG. 1, further provided with a disturbance calculator 19. The disturbance calculator 19 calculates the velocity (ground velocity) of the first ship caused by disturbance received by the first ship (surface current and wind force) based on a surface current velocity near the first ship which is estimated by the estimating apparatus 1g, and the wind force propellant velocity obtained from the wind force characteristic chart (the log velocity of the first ship caused by the wind force against the first ship). For example, the disturbance calculator 19 calculates the velocity of the first ship caused by the disturbance by adding the surface current velocity and the wind force propellant velocity. The disturbance calculator 19 notifies the velocity of the first ship caused by the disturbance to the controller 31.

The controller 31 controls the orientation of the rudder 35 so that the first ship travels along a course estimated in advance, based on the positional information of the first ship calculated based on the GPS signals received by the GPS signal receiver 2. Further, the controller 31 controls the orientation of the rudder 35 also based on the velocity of the first ship caused by the disturbance, which is calculated by the disturbance calculator 19.

With the conventional autopilot systems, the orientation of the rudder is controlled based on a first ship position obtained based on GPS signals. In this regard, with the autopilot system 30 illustrated in FIG. 20, the orientation of the rudder 35 is controlled based not only on the first ship position obtained based on the GPS signals, but also the disturbance (surface current, wind force, etc.) which influences the first ship position. Thus, it becomes possible to promptly perform suitable steering according to a hydrographic condition. As a result, it becomes possible to travel more accurately along the estimated course.

Figure 21:
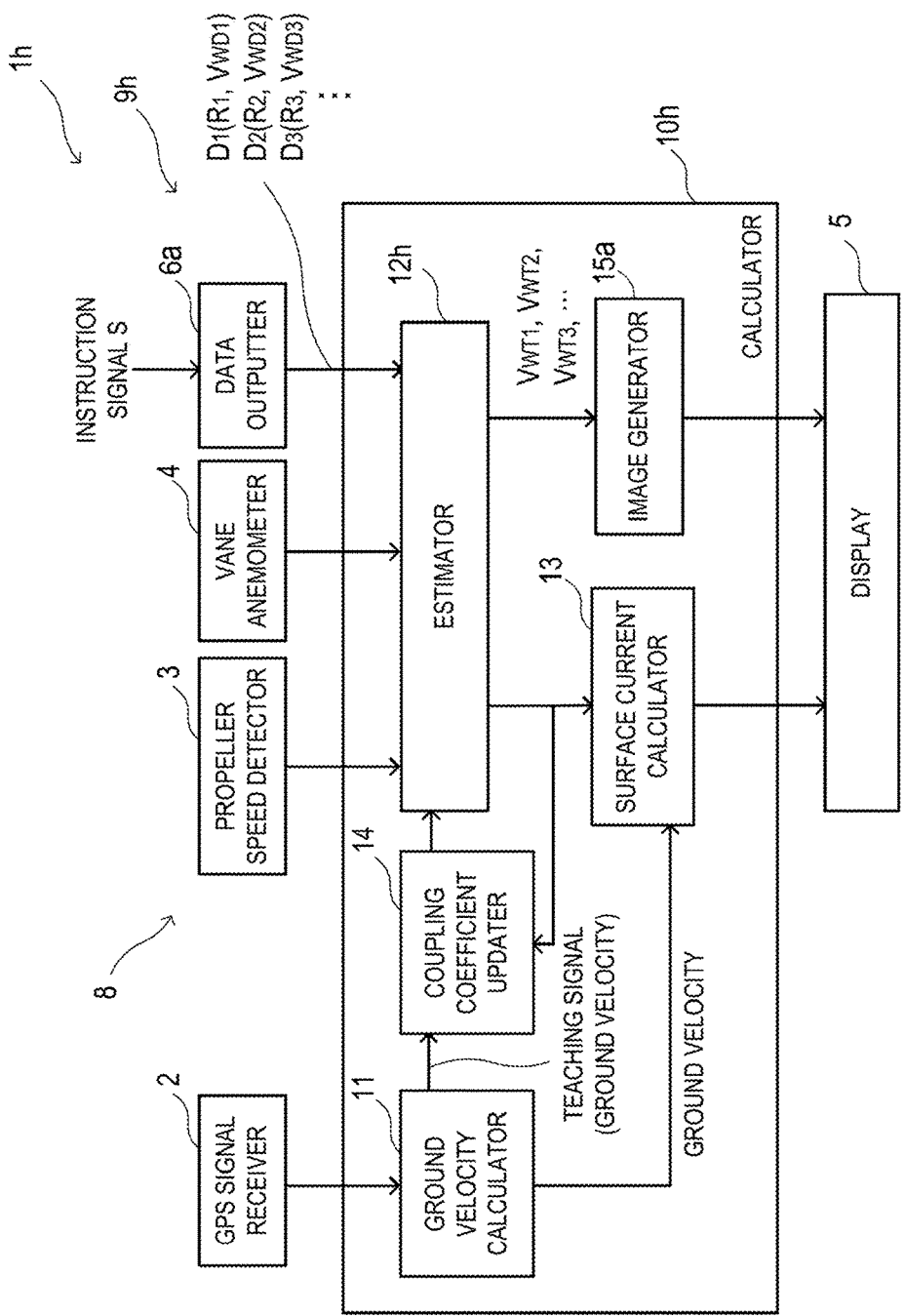
FIG. 21 is a block diagram illustrating a configuration of an estimating apparatus according to a modification.

(8) FIG. 21 is a block diagram illustrating a configuration of an estimating apparatus 1h according to a modification. In the embodiment and modifications described above, the estimating apparatuses capable of estimating the wind force characteristics as the ship characteristics are raised as examples. Meanwhile, the estimating apparatus 1h according to this modification is configured to be capable of estimating propulsion system characteristics as the ship characteristics. Here, the propulsion system characteristics are characteristics of mechanism components configured to produce a thrust in the ship. The estimating apparatus 1h according to this modification is capable of calculating, as the propulsion system characteristics, the propeller propulsion velocity with respect to the propeller rotational speed. Note that, the propeller propulsion velocity is a log velocity of the ship caused by the rotation of the propeller.

The estimating apparatus 1h according to this modification includes a surface current estimating device 8 and a propulsion system characteristic estimating device 9h (ship characteristic estimating device). Since the configuration and operation of the surface current estimating device 8 are the same as the surface current estimating device 8 of the estimating apparatus 1 according to the embodiment described above, the description thereof is omitted.

Configuration of Propulsion System Characteristic Estimating Device

The propulsion system characteristic estimating device 9h includes a GPS signal receiver 2, a propeller speed detector 3, a vane anemometer 4, a data outputter 6a, one or some of components constituting the calculator 10h (e.g., a ground velocity calculator 11, an estimator 12h, a coupling coefficient updater 14, and an image generator 15a), and a display 5. Since the configurations and operations of the GPS signal receiver 2, the propeller rotational speed detector 3, and the vane anemometer 4 are similar to the case of the surface current estimating device 8, the description thereof is omitted.

Once the data outputter 6a receives an instruction signal which is a signal to cause derivation of the propulsion system characteristics of the first ship, it sequentially outputs a plurality of parameter data Dn (n=1, 2, . . . ) to the estimator 12h. Each parameter data Dn includes rotational speed data $R_n$ (n=1, 2, . . . ) indicating the rotational speed of the propeller and wind velocity vector data $V_{WD1}$ indicating a wind velocity vector.

In this modification, different from the embodiment described above, the wind velocity vector data $V_{WD1}$ of the parameter data Dn indicate the same wind velocity vector, whereas the rotational speed data $R_n$ of the parameter data Dn indicate different rotational speeds. In this modification, the data outputter 6a outputs a true wind speed in a bow direction and a true wind speed in a starboard direction, as the wind velocity vector data $V_{WD1}$.

Note that, the instruction signal S described above is, for example, outputted to the data outputter 6a upon a suitable operation by a user on a control panel (not illustrated) provided to the estimating apparatus 1h. Here, the user may input a value of a desirable wind velocity vector (e.g., 0 [m/s]) through the control panel.

The calculator 10h is configured to estimate the propulsion system characteristics based on the parameter data Dn outputted from the data outputter 6 as described above. Note that since the configurations and operations of the ground velocity calculator 11 and the coupling coefficient updater 14 of calculator 10h are similar to the case of the surface current estimating device 8 described above, the description thereof is omitted.

As described above, the estimator 12h is configured to estimate the log velocity of the first ship. The estimator 12h receives the parameter data Dn outputted from the data outputter 6a, estimates the values corresponding thereto to be the magnitude $|V_{WTn}|$ of the log velocity $V_{WTn}$ (n=1, 2, . . . ), and outputs it as the first output value to the image generator 15a.

Figure 22:
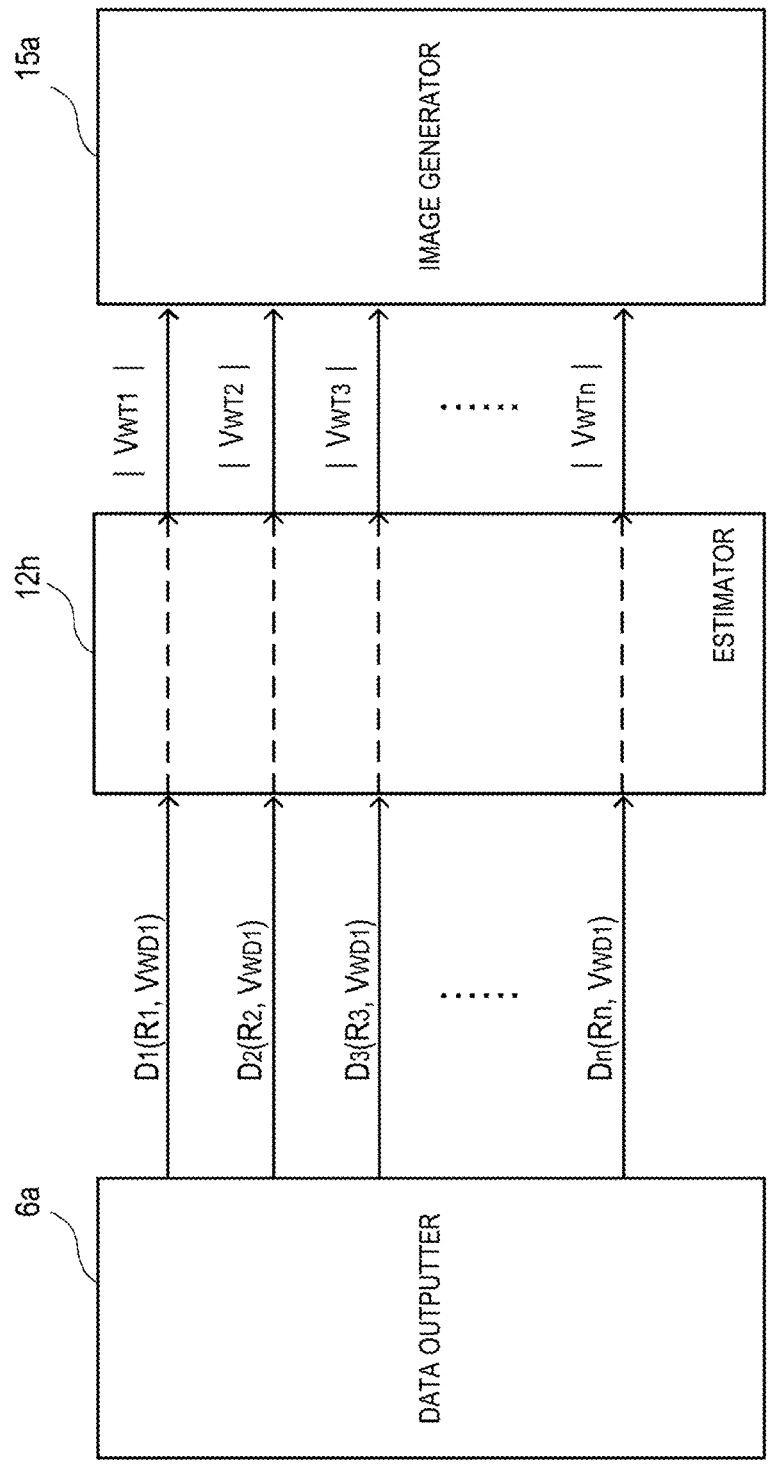
FIG. 22 is a view illustrating a correspondence of each parameter data outputted from a data outputter illustrated in FIG. 21, with a log velocity estimated based on the parameter data by the estimator, respectively.

Moreover, the estimator 12h receives the plurality of parameter data Dn as described above. Further the wind velocity vector data $V_{WD1}$ of the parameter data Dn indicate the same wind velocity vector, and the rotational speed $R_n$ of the parameter data Dn indicate different propeller rotational speeds. Thus, the estimator 12h outputs the magnitude $|V_{WTn}|$ of the log velocity $V_{WTn}$ when the wind force acts on the first ship is stable and the rotational speed of the propeller varies. FIG. 22 is a view illustrating a correspondence of the plurality of parameter data Dn outputted from the data outputter 6a, with the magnitudes $|V_{WTn}|$ of the log velocities $V_{WTn}$ estimated based on the parameter data Dn by the estimator 12h, respectively.

Figure 23:
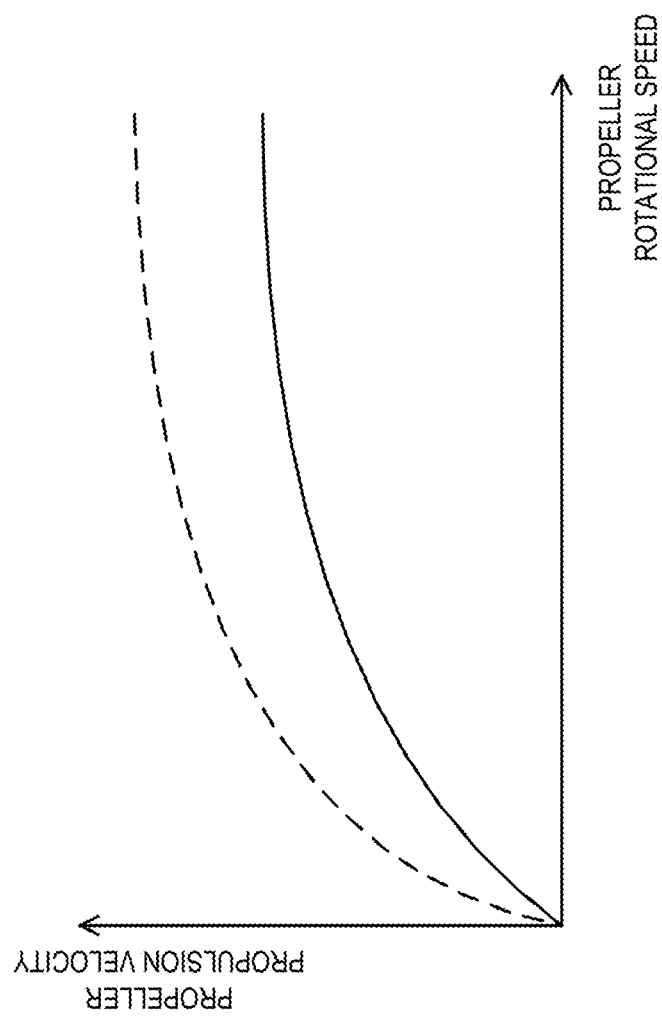
FIG. 23 is a view illustrating one example of a propulsion system characteristic chart generated by an image generator.

FIG. 23 is a view illustrating one example of a propulsion system characteristic chart generated by the image generator 15a. The image generator 15a generates the propulsion system characteristic chart indicated by the solid line of FIG. 23. For example, the image generator 15a plots on coordinates illustrated in FIG. 23 (the vertical axis indicates the magnitude of the log velocity and the horizontal axis indicates the rotational speed of the propeller) points defined by the propeller propulsion velocity $|V_{WTn}|$ which is the magnitude of the log velocity $V_{WTn}$ outputted from the estimator 12h, and the rotational speed Rn used in estimating the log velocity $V_{WTn}$. Further, the image generator 15a calculates, by using regression analysis etc., a curve (propulsion system characteristics) indicated by the solid line of FIG. 23, based on the plurality of plotted points. Moreover, this propulsion system characteristic chart is displayed on the display 5.

Generally, the propulsion system characteristics are ideal characteristics in trial for a new ship or immediately after repairing, for example, characteristics with which the propeller propulsion velocity with respect to the propeller rotational speed becomes higher (see the dashed line of FIG. 23). Therefore, for example, by comparing the propulsion system characteristics in trial for a new ship with the propulsion system characteristics of the first ship at a current time point, it is possible to estimate a deteriorated state of an engine, a stain state of a ship body surface, etc. By knowing these states, it is possible for the user to determine a more accurate operation plan, necessity of abnormality checkup, etc.

As described above, with the propulsion system characteristic estimating device 9h of the estimating apparatus 1h according to this modification, when stable wind force acts on the first ship, it is possible to estimate the change of the log velocity of the first ship caused by the propeller rotational speed.

Therefore, according to the propulsion system characteristic estimating device 9h, it is possible to easily grasp the relationship between the propeller rotational speed which is one of the parameters which influence the log velocity of the first ship, and the log velocity of the first ship caused by the rotational speed.

Further, with the propulsion system characteristic estimating device 9h, the estimator 12h is configured by using the neural network. Thus, it is possible to suitably configure the estimator 12h capable of outputting the log velocity.

Further, with the propulsion system characteristic estimating device 9h, the estimator 12h is updated to reduce the error of each second output value of the estimator 12h with respect to the ground velocity calculated by the ground velocity calculator 11. Thus, it is possible to configure the estimator 12h provided with the learning function. Additionally, since the propulsion system characteristic estimating device 9h is capable of accumulating a large amount of data required for estimating an accurate log velocity during the travel, it is possible to omit works of preparing these multiple learning data (data of a ground velocity under a certain condition) in advance and setting a suitable coupling coefficient based on these learning data.

Figure 24:
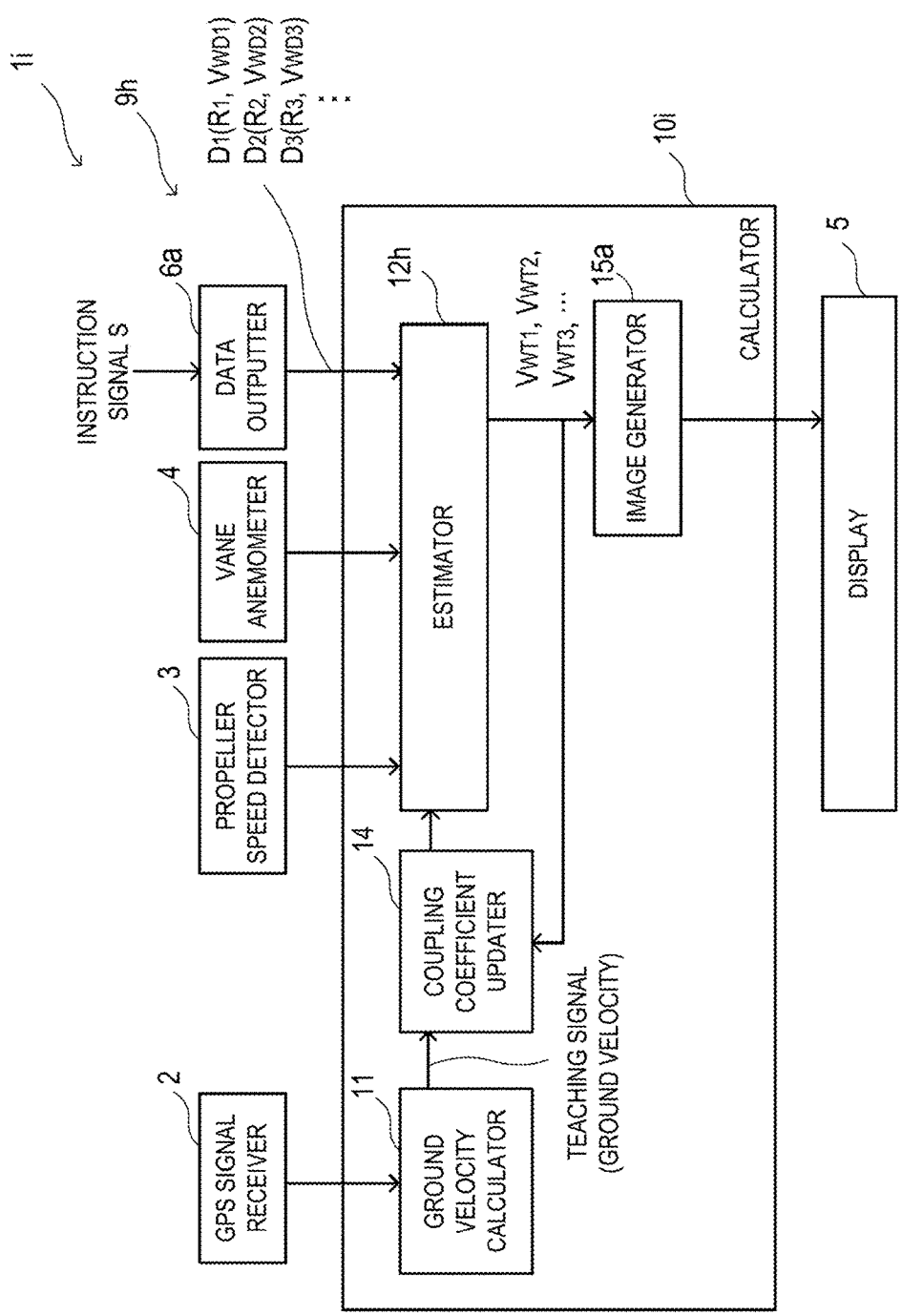
FIG. 24 is a block diagram illustrating a configuration of an estimating apparatus according to a modification.

(9) FIG. 24 is a block diagram illustrating a configuration of an estimating apparatus 1i according to a modification. A calculator 10i of the estimating apparatus 1i according to this modification is different from the calculator 10h illustrated in FIG. 21, and has a configuration in which the surface current calculator 13 is omitted. That is, the estimating apparatus 1i according to this modification does not have a function as the surface current estimating device 8, and is provided as a propulsion system characteristic estimating device 9h. Therefore, in accordance with the estimating apparatus 1i according to this modification, different from the case of the modification illustrated in FIG. 21, the surface current near the first ship cannot be estimated, whereas similarly to the case of the modification illustrated in FIG. 21, it is possible to estimate the propulsion system characteristics of the first ship.

Note that, the respective modifications described as modifications of the estimating apparatus 1 according to the embodiment described above may suitably applied to either of the modifications illustrated in FIGS. 21 and 24. Further, by suitably combining the estimating apparatus 1 according to the embodiment described above with the estimating apparatus illustrated in FIG. 21 or 24, an estimating apparatus capable of estimating the surface current velocity near the first ship, the wind force characteristics of the first ship, and the propulsion system characteristics of the first ship may be configured.

(10) In the modification illustrated in FIG. 21, by displaying the propulsion system characteristic chart on the display 5, although the state of the propulsion system at the current time point is notified to the user, it is not limited to this. For example, the display may also display an index indicating the deteriorated state of the propulsion system.

Figure 25A:
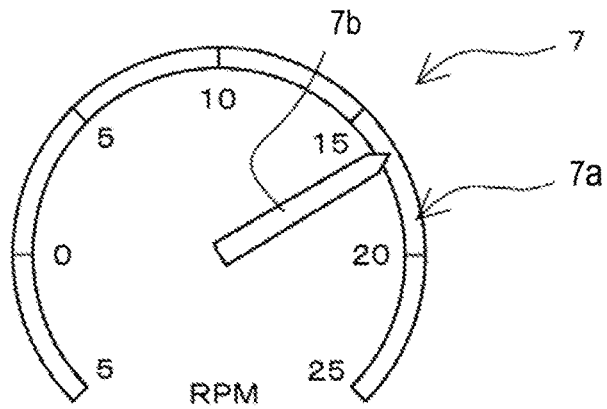
FIGS. 25(A) to 25(C) are views illustrating one example of a rotational speed meter displayed on a display.
Figure 25B:
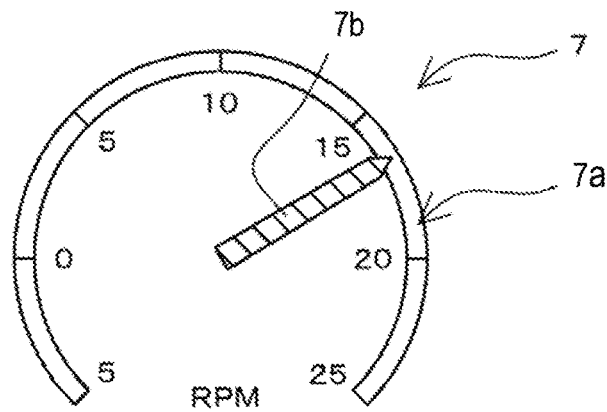
Figure 25C:
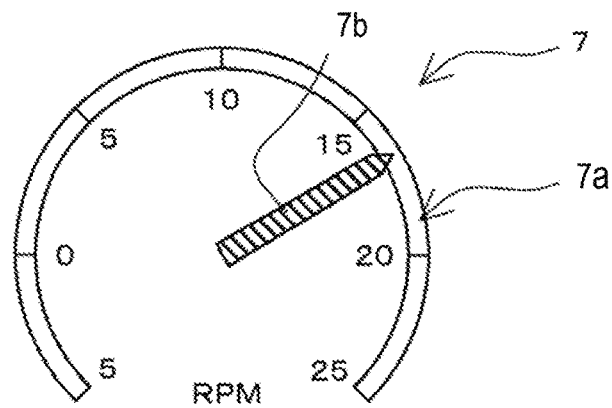

FIGS. 25(A) to 25(C) are views illustrating one example of a rotational speed meter 7 displayed on the display. The rotational speed meter 7 is provided with a scale portion 7a on which numerical values of the rotational speed are indicated, and configured so that an indication pointer 7b indicates the rotational speed of the propeller.

Further in this embodiment, the color of the indication pointer 7b functions as the index indicating the deteriorated state of the propulsion system. For example, in a state where the propulsion system is not deteriorated, the color of the indication pointer 7b is displayed, for example, in blue (no hatching) as illustrated in FIG. 25(A). Moreover, in a state where the propulsion system is slightly deteriorated, the color of the indication pointer 7b is displayed, for example, in yellow (hatched with wide gaps) as illustrated in FIG. 25(B). Furthermore, in a state where the propulsion system is greatly deteriorated and in need of repairing, the color of the indication pointer 7b is displayed, for example, in red (hatched with narrow gaps) as illustrated in FIG. 25(C). Thus, it is possible for the user to easily, visually recognize the deterioration of the propulsion system characteristics.

The deteriorated state of the propulsion system characteristics described above may be determined, for example, based on a ratio between the propeller propulsion velocity at a particular speed of the propulsion system in trial for a new ship or immediately after repairing, and the propeller propulsion velocity at a particular speed of the propulsion system at the current time point.

Note that, as the index indicating the deteriorated state of the propulsion system, without limiting to the colors as described above, for example, a pattern corresponding to the deteriorated state may be applied, or brightness of the rotational speed meter 7 may gradually be lowered according to the deteriorated state.

Figure 26:
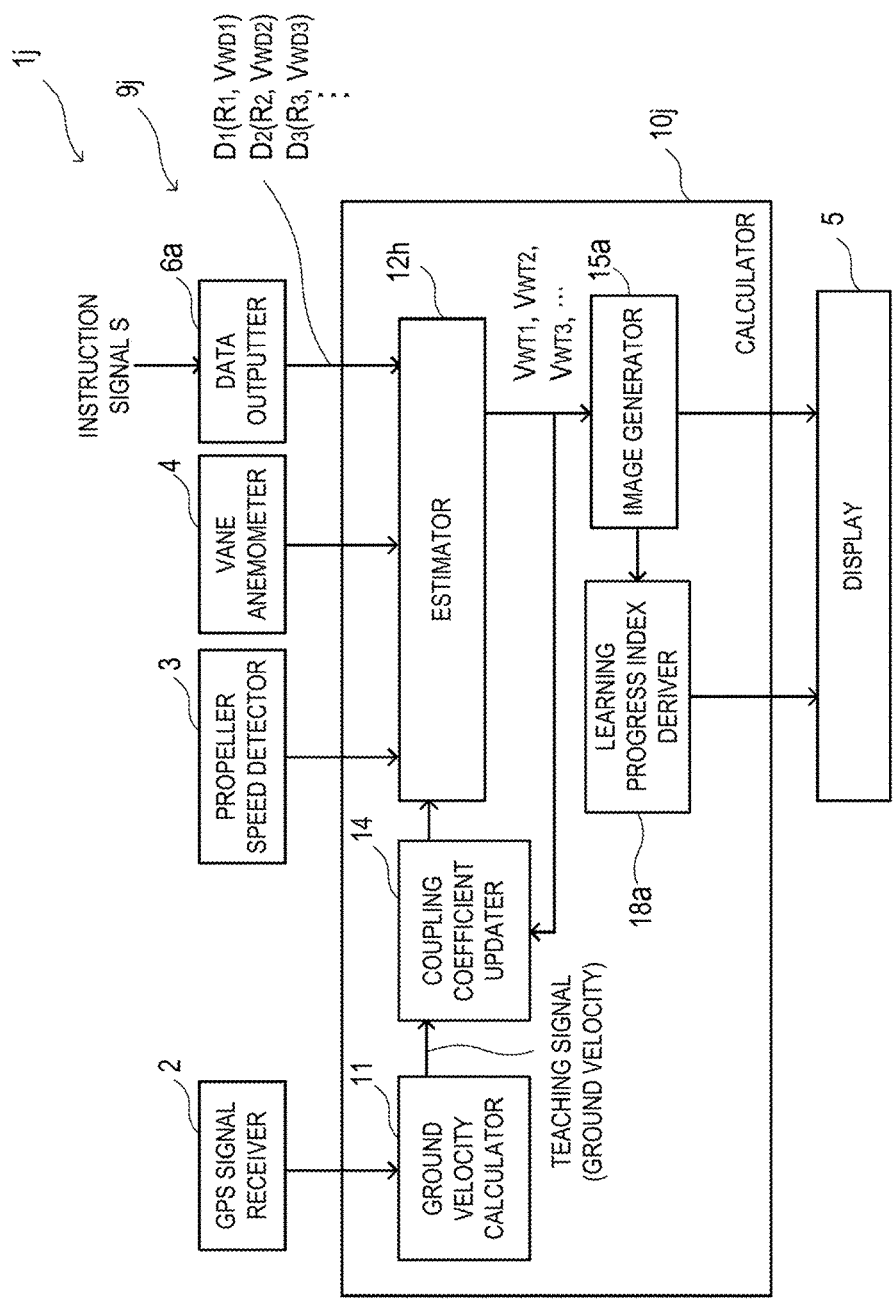
FIG. 26 is a block diagram illustrating a configuration of an estimating apparatus according to a modification.

(11) FIG. 26 is a block diagram illustrating a configuration of an estimating apparatus 1j according to a modification. The estimating apparatus 1j according to this modification has a configuration of the estimating apparatus 1i illustrated in FIG. 24, further provided with a learning progress index deriver 18a.

Figure 27:
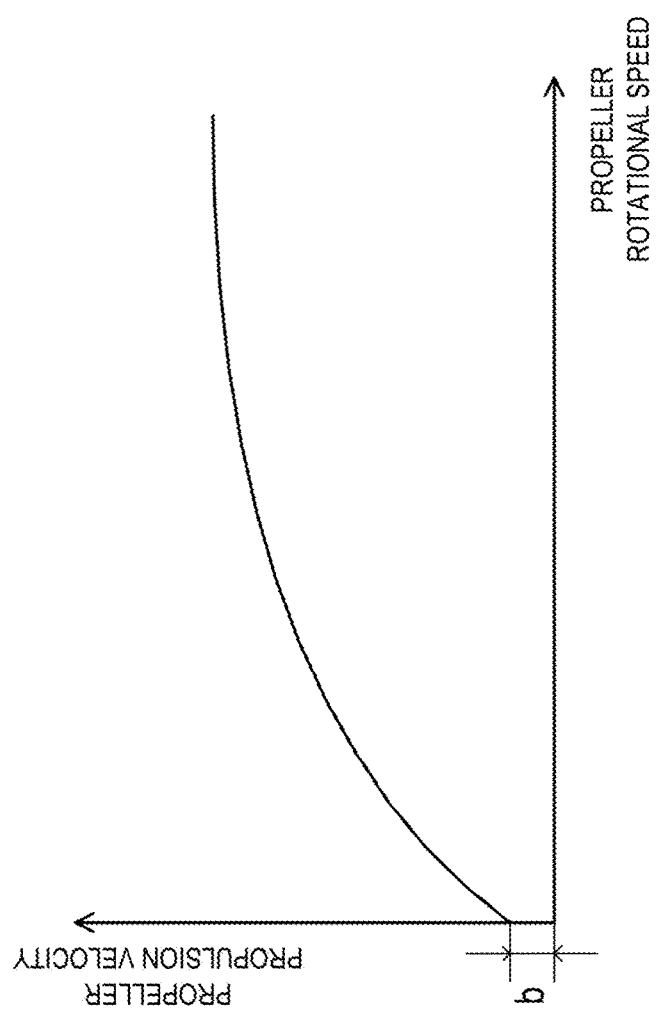
FIG. 27 is a view illustrating one example of a propulsion system characteristic chart generated by an image generator, illustrating a learning progress index.

FIG. 27 is a view illustrating one example of the propulsion system characteristic chart generated by the image generator 15a, illustrating the learning progress index.

The propulsion system characteristic chart is a chart indicating the propeller propulsion velocity of the first ship when the propeller rotational speed is changed. Therefore, when the propeller rotational speed is zero, the propeller propulsion velocity should ideally become zero. Thus, it is considered that if a sufficient number of learning data is acquired, in the propulsion system characteristic chart, the propeller propulsion velocity when the propeller rotational speed is zero comes close to zero. On the other hand, it is considered that if the sufficient number of learning data is not acquired, the value of the propeller propulsion velocity when the propeller rotational speed is zero ("b" in FIG. 27) becomes high.

In this regard, in the estimating apparatus 1j according to this modification, the learning progress index deriver 18 detects the value of the propeller propulsion velocity b illustrated in FIG. 27 and derives, as the learning progress index, the numerical value according to the magnitude of the propeller propulsion velocity b. For example, the learning progress index deriver 18 derives, as the learning progress index, the value of the propeller propulsion velocity b, and displays it on the display 5. It is possible for the user to look at the numerical value and quantitatively grasp reliability of the propulsion systems characteristic chart displayed on the display 5.

Note that the learning progress index is not limited to the propeller propulsion velocity b as described above, and may be displayed in a different mode. For example, the learning progress index may be an alphabet ranked into a plurality of levels ("A" indicates high reliability, "B" indicates medium reliability, and "C" indicates low reliability). Alternatively, the learning progress index may be a color of the propulsion system characteristic chart displayed on the display 5 (blue indicates high reliability, yellow indicates medium reliability, and red indicates low reliability).

(12) In each of the embodiment and modifications described above, the display 5 displays the wind force characteristics (see FIG. 7) or the propulsion system characteristics (FIG. 27); however, for example, the display 5 may display the first ship position after a particular period of time from a current time point.

Figure 28:
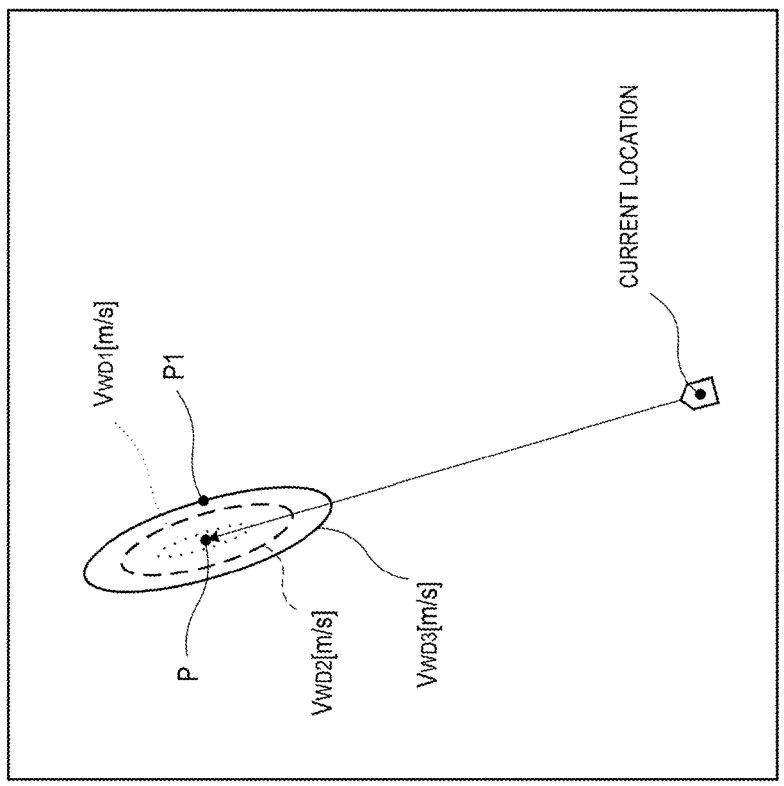
FIG. 28 is one example of a map displayed on a display of an estimating apparatus according to a modification, indicating a position of a first ship after a particular period of time from a current time point.

FIG. 28 is one example of a map displayed on the display 5 of the estimating apparatus according to this modification, indicating the position of the first ship after the particular time period. The current location of the first ship and an estimated position of the first ship after the particular time period are displayed on the map illustrated in FIG. 28. In the example illustrated in FIG. 28, the terminal point of the arrow indicates the first ship position P after the particular time period when the propeller of the first ship keeps rotating at a certain rotational speed. Further, the oval-like closed curve illustrated in FIG. 28 indicates a possible drift of the first ship from the position P by the wind force against the first ship. For example, the point P1 indicates the first ship position in the case where the wind at a velocity $V_{WD3}$ [m/s] keeps acting on the first ship from the left direction thereof. Therefore, according to this modification, it is possible to accurately predict a future position of the first ship in consideration of the velocity of the wind force which acts on the first ship.

Note that, in predicting the future position of the first ship, other than the wind force characteristics described above, the velocity of the surface current near the first ship calculated by the estimating apparatus 1 illustrated in FIG. 1, the propulsion system characteristics estimated by the estimating apparatus 1h illustrated in FIG. 21, etc. may be taken into consideration. Thus, it is possible to predict the future position of the first ship more accurately.

(13) Moreover, in each of the embodiment and modifications described above, if the accumulation of learning data is not sufficient, the learning data may be complemented.

Figure 29:
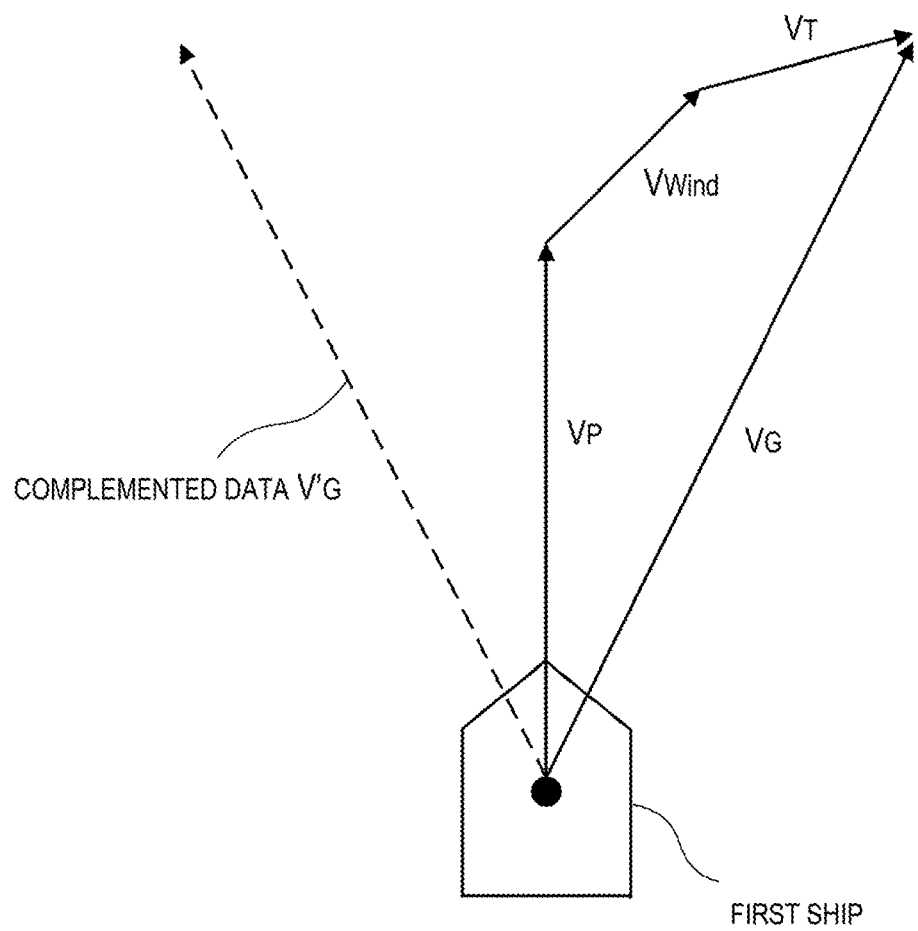
FIG. 29 is a schematic view illustrating complement of learning data.

FIG. 29 is a schematic view illustrating complement of the learning data. Since a ship has a substantially laterally symmetrical shape, the wind force characteristics are estimated to be laterally symmetric as well. Specifically, for example, between a case where a ship traveling under a certain condition receives wind from the port quarter at an angle of 45 degrees and a case where the ship receives wind from the starboard quarter at an angle of 45 degrees (wind velocities are the same), the traveling directions are estimated to be laterally symmetric. Therefore, with reference to FIG. 29, for example, in a case where the propeller rotational speed is a particular speed, the wind direction is on the port quarter at the angle of 45 degrees, and the wind speed is a particular speed, if the ground velocity is $V_G$, the data may be complemented as follows based on learning data thereof. For example, as learning data for when the propeller rotational speed and the wind speed are the same as the learning data of the above case and the wind direction is on the starboard quarter at an angle of 45 degrees, a laterally inverted vector $V'_G$ may be complemented. By complementing the learning data as above, for example, even in an initial stage where the accumulation of learning data is insufficient, it is possible to accurately estimate a surface current, wind force characteristics, propulsion system characteristics, etc.

DESCRIPTION OF REFERENCE NUMERALS

| | |
|---|---|
| 6, 6a | Data outputter |
| 9, 9b, 9c, 9d, 9e, 9f | Wind Force Characteristic Estimating Device (Ship Characteristic Estimating Device) |
| 9h, 9j | Propulsion System Characteristic Estimating Device (Ship Characteristic Estimating Device) |
| 12, 12c, 12d, 12h | Estimator |

The invention claimed is:

1. A ship characteristic estimating device, comprising:
a data outputter configured to output a plurality of parameter data respectively including rotational speed data indicating a rotational speed of a propeller of a ship, and wind velocity vector data indicating a wind velocity vector of wind force that may act on the ship; and
a processor programmed to at least receive the plurality of parameter data outputted from the data outputter, estimate values corresponding to the respective parameter data to be log velocity vectors of the ship, and output the log velocity vectors as first output values,
wherein the rotational speed data included in the plurality of parameter data indicate the same rotational speed,
wherein the wind velocity vector data included in the plurality of parameter data indicate different wind velocity vectors, and
wherein each of the first output values is estimated and outputted as the log velocity vector of the ship when the ship travels at the rotational speed indicated by the rotational speed data.

2. The ship characteristic estimating device of claim 1, wherein the processor is configured by using a neural network,
wherein the processor has:
at least two input gates, respectively configured to receive one of the rotational speed data and the wind velocity vector data; and
an output gate configured to output the first output value, and
wherein values outputted from the input gates of the neural network are multiplied by a coupling coefficient and then transmitted to the output gate.

3. The ship characteristic estimating device of claim 2, further comprising:
a ground velocity calculator configured to calculate a ground velocity vector of the ship traveling on water;
a propeller speed detector configured to detect the rotational speed of the propeller; and
a vane anemometer equipped in the ship and configured to measure the wind velocity vector of the wind force against the ship,
wherein each of the input gates receives one of the rotational speed of the propeller detected by the propeller speed detector, and the wind velocity vector measured by the vane anemometer,
wherein the output gate estimates, as the log velocity vector of the ship, a value corresponding to a condition defined by a combination of the rotational speed of the propeller detected by the propeller speed detector and the wind velocity vector measured by the vane anemometer, and outputs the value as a second output value, and further comprising an updater configured to compare the second output value with the ground velocity vector calculated as a teaching signal by the ground velocity calculator, and update the coupling coefficient to reduce an error between the second output value and the teaching signal.

4. The ship characteristic estimating device of claim 3, further comprising a display configured to display a range where the ship is predicted to be located therein after a particular period of time from a current time point, based on the first output value outputted from the processor.

5. An autopilot system, comprising:
a GNSS signal receiver equipped in a ship and configured to receive GNSS signals, and
a controller configured to control a rudder angle of the ship based on positional information of the ship that is calculated based on GNSS signals received by the GNSS signal receiver,
further comprising the ship characteristic estimating device of claim 3,
wherein the controller controls the rudder angle of the ship based also on the first output value outputted from the processor of the ship characteristic estimating device.

6. The ship characteristic estimating device of claim 1, wherein the processor has a memory including a plurality of cells respectively configured to store a ground velocity vector of the ship under one of a plurality of conditions defined by a combination of the rotational speed of the propeller of the ship and the wind velocity vector of the wind force against the ship for every one of the plurality of conditions, and the processor outputs, as the first output value, an average value of the ground velocity vectors stored in the cells specified by the condition corresponding to the combination of the rotational speed data and the wind velocity vector data included in the received parameter data.

7. The ship characteristic estimating device of claim 6, further comprising:
a ground velocity calculator configured to calculate a ground velocity vector of the ship traveling on water;
a propeller speed detector configured to detect the rotational speed of the propeller; and
a vane anemometer equipped in the ship and configured to measure the wind velocity vector of the wind force against the ship,
wherein the processor further programmed to store the ground velocity vector calculated by the ground velocity calculator in the cell specified by a combination of the rotational speed detected by the propeller speed detector and the wind velocity vector measured by the vane anemometer when data required for calculating the ground velocity vector is acquired.

8. The ship characteristic estimating device of claim 7, further comprising a display configured to display a range where the ship is predicted to be located therein after a particular period of time from a current time point, based on the first output value outputted from the processor.

9. An autopilot system, comprising:
a GNSS signal receiver equipped in a ship and configured to receive GNSS signals, and
a controller configured to control a rudder angle of the ship based on positional information of the ship that is calculated based on GNSS signals received by the GNSS signal receiver,
further comprising the ship characteristic estimating device of claim 7, wherein the controller controls the rudder angle of the ship based also on the first output value outputted from the processor of the ship characteristic estimating device.

10. An autopilot system, comprising:
a GNSS signal receiver equipped in a ship and configured to receive GNSS signals; and
a controller configured to control a rudder angle of the ship based on positional information of the ship that is calculated based on GNSS signals received by the GNSS signal receiver,
further comprising the ship characteristic estimating device of claim 1,
wherein the controller controls the rudder angle of the ship based also on the first output value outputted from the processor of the ship characteristic estimating device.

11. A ship characteristic estimating device, comprising:
a data outputter configured to output a plurality of parameter data respectively including rotational speed data indicating a rotational speed of a propeller of a ship, and wind velocity vector data indicating a wind velocity vector of wind force that may act on the ship; and
a processor programmed to at least receive the plurality of parameter data outputted from the data outputter, estimate values corresponding to the respective parameter data to be log velocity vectors of the ship, and output the log velocity vectors as first output values,
wherein the rotational speed data included in the plurality of parameter data indicate different rotational speeds,
wherein the wind velocity vector data included in the plurality of parameter data indicate the same wind velocity vector, and
wherein each of the first output values is estimated and outputted as the log velocity vector of the ship when the wind velocity vector indicated by the wind velocity vector data acts on the ship.

12. The ship characteristic estimating device of claim 11, wherein the processor is configured using a neural network, wherein the processor has:
at least two input gates, respectively configured to receive one of the rotational speed data and the wind velocity vector data; and
an output gate configured to output the first output value, and
wherein values outputted from the input gates of the neural network are multiplied by a coupling coefficient and then transmitted to the output gate.

13. The ship characteristic estimating device of claim 12, further comprising:
a ground velocity calculator configured to calculate a ground velocity vector of the ship traveling on water;
a propeller speed detector configured to detect the rotational speed of the propeller; and
a vane anemometer equipped in the ship and configured to measure the wind velocity vector of the wind force against the ship,
wherein each of the input gates receives one of the rotational speed of the propeller detected by the propeller speed detector, and the wind velocity vector measured by the vane anemometer,
wherein the output gate estimates, as the log velocity vector of the ship, a value corresponding to a condition defined by a combination of the rotational speed of the propeller detected by the propeller speed detector and the wind velocity vector measured by the vane anemometer, and outputs the value as a second output value, and further comprising an updater configured to
compare the second output value with the ground velocity vector calculated as a teaching signal by the ground velocity calculator, and
update the coupling coefficient to reduce an error between the second output value and the teaching signal.

14. The ship characteristic estimating device of claim 13, further comprising a display configured to display a range where the ship is predicted to be located therein after a particular period of time from a current time point, based on the first output value outputted from the processor.

15. An autopilot system, comprising:
a GNSS signal receiver equipped in a ship and configured to receive GNSS signals; and
a controller configured to control a rudder angle of the ship based on positional information of the ship that is calculated based on GNSS signals received by the GNSS signal receiver,
further comprising the ship characteristic estimating device of claim 13,
wherein the controller controls the rudder angle of the ship based also on the first output value outputted from the processor of the ship characteristic estimating device.

16. The ship characteristic estimating device of claim 11, wherein the processor has a memory including a plurality of cells respectively configured to store the ground velocity vector of the ship under one of a plurality of conditions defined by a combination of the rotational speed of the propeller of the ship and the wind velocity vector of the wind force against the ship for every one of the plurality of conditions, and the processor outputs, as the first output value, an average value of the ground velocity vectors stored in the cells specified by the condition corresponding to the combination of the rotational speed data and the wind velocity vector data included in the received parameter data.

17. The ship characteristic estimating device of claim 16, further comprising:
a ground velocity calculator configured to calculate a ground velocity vector of the ship traveling on water;
a propeller speed detector configured to detect the rotational speed of the propeller; and
a vane anemometer equipped in the ship and configured to measure the wind velocity vector of the wind force against the ship,
wherein the processor is further programmed to store the ground velocity vector calculated by the ground velocity calculator in the cell specified by a combination of the rotational speed detected by the propeller speed detector and the wind velocity vector measured by the vane anemometer when data required for calculating the ground velocity vector is acquired.

18. The ship characteristic estimating device of claim 17, further comprising a display configured to display a range where the ship is predicted to be located therein after a particular period of time from a current time point, based on the first output value outputted from the processor.

19. An autopilot system, comprising:
a GNSS signal receiver equipped in a ship and configured to receive GNSS signals, and
a controller configured to control a rudder angle of the ship based on positional information of the ship that is calculated based on GNSS signals received by the GNSS signal receiver,
further comprising the ship characteristic estimating device of claim 17,
wherein the controller controls the rudder angle of the ship based also on the first output value outputted from the processor of the ship characteristic estimating device.

20. An autopilot system, comprising:
a GNSS signal receiver equipped in a ship and configured to receive GNSS signals, and
a controller configured to control a rudder angle of the ship based on positional information of the ship that is calculated based on GNSS signals received by the GNSS signal receiver,
further comprising the ship characteristic estimating device of claim 11,
wherein the controller controls the rudder angle of the ship based also on the first output value outputted from the processor of the ship characteristic estimating device.

* * * * *